US011397658B1

(12) United States Patent
Pang et al.

(10) Patent No.: US 11,397,658 B1
(45) Date of Patent: Jul. 26, 2022

(54) TESTING RECOMMENDED COMPUTE PLATFORMS FOR A WORKLOAD

(71) Applicant: Amazon Technologies, Inc., Seattle, WA (US)

(72) Inventors: Bo Pang, Seattle, WA (US); Qijia Chen, Seattle, WA (US); Leslie Johann Lamprecht, Seattle, WA (US); Mohit Gupta, Seattle, WA (US); Letian Feng, Clyde Hill, WA (US); Roberto Pentz De Faria, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/105,236

(22) Filed: Nov. 25, 2020

(51) Int. Cl.
*G06F 9/44* (2018.01)
*G06F 11/34* (2006.01)
*G06F 11/30* (2006.01)
*G06F 11/36* (2006.01)
*G06F 9/455* (2018.01)
*G06F 9/451* (2018.01)

(52) U.S. Cl.
CPC .......... *G06F 11/3414* (2013.01); *G06F 9/451* (2018.02); *G06F 9/45558* (2013.01); *G06F 11/301* (2013.01); *G06F 11/3688* (2013.01); *G06F 11/3692* (2013.01); *G06F 2009/45591* (2013.01); *G06F 2009/45595* (2013.01)

(58) Field of Classification Search
CPC .. G06F 11/3414; G06F 9/451; G06F 9/45558; G06F 11/301; G06F 11/3688; G06F 11/3692
See application file for complete search history.

(56) References Cited

U.S. PATENT DOCUMENTS

| | | | |
|---|---|---|---|
| 10,097,627 B1 | 10/2018 | Gafton et al. | |
| 2007/0136722 A1* | 6/2007 | Lesher | G06F 8/61 717/178 |
| 2012/0137002 A1* | 5/2012 | Ferris | G06F 9/5072 709/226 |
| 2016/0011913 A1* | 1/2016 | Novikov | G06F 9/4856 718/1 |
| 2016/0034372 A1* | 2/2016 | Panda | G06F 11/263 714/33 |
| 2016/0285966 A1* | 9/2016 | Brech | G06F 11/3433 |
| 2017/0024260 A1* | 1/2017 | Chandrasekaran | G06F 8/63 |

* cited by examiner

*Primary Examiner* — Hang Pan
(74) *Attorney, Agent, or Firm* — Lee & Hayes, P.C.

(57) ABSTRACT

Techniques for a service provider network to allow users to quickly and easily establish a testing environment to test various virtual machine (VM) instance types for hosting their workloads. Rather than identifying and recommending optimized VM instance types for hosting workloads of users, the techniques allow for users to initially test the VM instance types and determine how well their workloads perform on the VM instance types. Users can quickly and easily (e.g., "one-click" input) request that a testing environment be established. The optimization service can then test one or more recommended VM instance types for the users' workloads in the testing environment. The optimization service can monitor the performance of the VM instance types while they host the "test workloads," and provide the users with performance metrics to help them decide if they would like to migrate their workloads to the recommended VM instance types.

20 Claims, 14 Drawing Sheets

TESTING RECOMMENDED COMPUTE PLATFORMS FOR A WORKLOAD

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single physical computing device to host multiple virtual computing resources. For example, a single computing device can host multiple instances of virtual machines (VM) (also referred to herein as "virtual machine instances" or "VM instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

To further increase the utilization of the computing resources, and also to more effectively meet the computing resource needs of users, service provider networks may offer a variety of different types of virtual machines. Specifically, a service provider network may offer a selection of VM instance types that are optimized, or biased, to support different use cases on behalf of users. In such examples, the different VM instance types may be allocated different amounts, and/or different combinations, of the computing resources of underlying physical computing devices to provide users with flexibility to choose a VM instance that is more appropriately optimized to support their computing resource needs.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
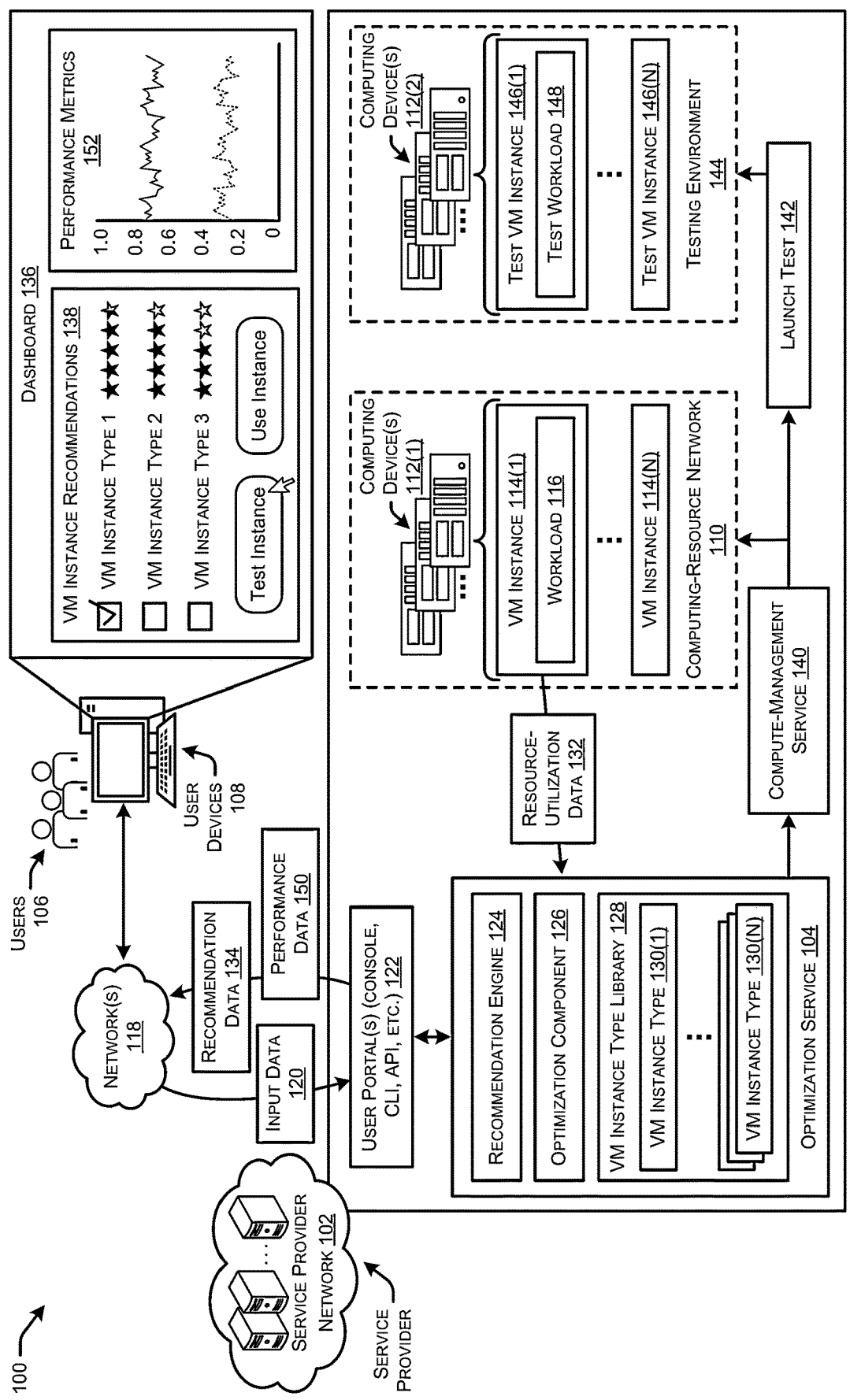
FIG. 1 illustrates a system-architecture diagram of an example environment in which an optimization service of a service provider network determines and recommends VM instance types that are optimized to support workloads on behalf of users. Further, the optimization service provides the users with options to test the recommended VM instance types prior to migrating fleets of workloads onto the recommended VM instance types.

Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user.

As noted above, the service provider networks may utilize virtualization technologies such that the computing devices can each host multiple VM instances that appear and operate as independent computing devices to support workloads of users. Rather than allocating all of the computing resources of a physical computing device to support a single workload, the computing resources of a physical computing device can be allocated amongst multiple VM instances that support different workloads. The service provider network supports many different types of workloads on behalf of users, and these workloads often have different computing resource needs. As described herein, a workload is implemented by a designated set of computing resources and the workload itself can be considered as code or logic that performs functionality using the computing resources. The service provider network may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of a service provider network.

In light of the different workloads that are supported on behalf of users, the service provider network may provide users with a selection of a variety of VM instance types optimized to support different workloads. Generally, each VM instance type may be allocated a different amount of computing resources, and/or different combination of computing resources, such that the VM instance types are optimized, or computationally biased, to support different workloads. As used herein, computing resources refers to compute, memory, storage, networking, and, in some implementations, graphics processing. As an example, one VM instance type may be allocated a larger amount of compute (e.g., processor cycles) and be optimized to support compute-heavy workloads, whereas another VM instance type may be allocated a larger amount of storage (e.g., disk space) and be optimized to support storage-intensive workloads. In this way, users can select a VM instance type or platform that is more optimized to support their workload, thereby increasing the performance of the workload while reducing underutilization of computing resources by the service provider network.

Generally, an increase in the complexity and diversity of VM instance types offered by the service provider network is advantageous and results in a higher likelihood that workloads are supported by a more optimized VM instance. While a large variety of VM instance types is advantageous for various reasons (e.g., efficient utilization of computing resources, high performance for workloads, etc.), it also may become difficult for users, particularly new users, to select a suitable or appropriate VM instance type to support their workload(s). For example, users may attempt to map out the computing resource needs of their workload and then peruse the offering of VM instance types to locate a VM instance type that seems appropriate for their needs. In other examples, users may go through a time-consuming trial-and-error process to analyze performance of their workloads using different VM instance types. However, not only is this time consuming, but it may also result in users having their workloads hosted on VM instance types that are either overutilized and resource constrained, or underutilized and resulting in computing resources that may be unused and sitting idle. As an example, users may be overly cautious and select an oversized VM instance type to help ensure that their workloads are never resource constrained, which may result in low utilization of computing resources of the service provider network.

In some instances, service provider networks may provide an optimization service to help users optimize the selection, configuration, and utilization of VM instance types to support their workloads. The optimization service may provide recommendations to users that help improve performance of their workloads, and that also increase the aggregate utilization of computing resources of the service provider network. While the optimization service may perform techniques to help new users select a VM instance type that is optimized to host or support their workload, the new VM instance type that is recommended may be drastically different than the current VM instance type that is hosting the workload. Although the recommended VM instance type may be more optimized for hosting the workload, users may be hesitant to move away from the current VM instance type that has been working to host their workload to a new VM instance type that is so different. Accordingly, users may be hesitant to accept the recommendations of the optimized VM instance types.

This disclosure describes techniques and technologies implemented by an optimization service of a service provider network that allows users to quickly and easily establish a testing environment to test various virtual machine (VM) instance types for hosting their workloads. Rather than identifying optimized VM instance types for a workload and recommending that users host their workloads on those VM instance types, the techniques described herein allow for users to initially test the VM instance types to determine how well their workloads perform on recommended VM instance types. The techniques include an automated process by which users can quickly and easily (e.g., "one-click" input) request that a testing environment be established. The users can also request that one or more of the recommended VM instance types be tested for their workloads in the testing environment. The optimization service can monitor the performance of the recommended VM instance types while they host the "test workloads," and provide the users with performance metrics to help them decide if they would like to migrate all of their workloads to the recommended VM instance types. In this way, users may easily gain trust in recommendations provided by the optimization service and move their workloads to be hosted on more optimized VM instance types.

The optimization service may initially provide a user with a listing of recommended VM instance types that are optimized to host a workload of the user. For instance, the optimization service may have collected resource-utilization data for the workload of the user that is supported by the service provider network, and based on the resource-utilization characteristics (or "resource-consumption characteristics") of the workload, identify one or more VM instance types that have been allocated different amounts of computing resources, and/or different combination of computing resources, such that the VM instance types are optimized, or computationally biased, to support the resource-utilization characteristics of the workload.

However, in order to determine how well the VM instance types would perform for hosting a workload and understand the impact, a user would have to set up a fleet of test VM instance types with the recommended adjustments and test it with the production workload. However, this process is tedious and time-consuming, which may hinder the adoption of the recommendations provided by the optimization service.

Accordingly, the optimization service may further provide the user with a quick and easy option that, when selected, automates the testing of the recommended VM instance types on behalf of the user. For example, the user may access a console via a user account registered with the service provider and interact with a testing option. In one example, the user may be presented with a one-click, user-interface option to test the recommended VM instance types. Upon receiving input indicating a selection of the testing option, the optimization service may automatically establish a testing environment to test one or more VM instance types for hosting the workload of the user.

In some instances, the optimization service may simply provision a test VM instance type behind a load balancer in the user's production environment to host a test workload that handles real traffic. In another example, the test VM instance may receive traffic flows that have been duplicated from real traffic flows such that the test workload running on the test VM instance does not affect the actual production of the fleet of VM instances running the workload of the user.

In some instances, the optimization service may establish a testing environment that mimics the actual production environment of user. For instance, the optimization service may utilize load balancers with the same or similar configuration settings, virtual private networks with the same or similar configuration settings, and so forth. Further, the optimization service may obtain the deployment package of the workload as well as the operating system (and/or other data) associated with running the workload, and deploy the test workload onto a test VM instance type. The test load balancer may load balance traffic (e.g., real traffic, duplicate traffic, simulated traffic, etc.) among one or more test VM instance types that are running test workloads.

While the test workloads are running on test VM instance types using any testing technique, the optimization service may monitor the health, performance, and/or resource-utilization characteristics of the test VM instance types and test workloads. The optimization service may determine various performance metrics for the test VM instance types such as resource utilization (e.g., percentage of available CPU consumed, percentage of available memory consumed, etc.), as well as metrics for the test workloads such as latency, error count, and so forth. The optimization service may track and calculate these performance metrics over time and provide the user with the performance metrics. The user may then use the performance metrics to determine how well the test VM instance types performed when hosting their workload, and if the test VM instance types performed better than the current VM instance type, the user may select an option to use the test VM instance type for hosting all of their workloads.

Although the techniques described herein are described primarily with respect to determining a VM instance type for a workload, and provisioning a VM instance to support the workload, the techniques are equally applicable for any number of VM instances and/or workloads. For example, a workload may be supported by a VM instance, by multiple VM instances, and/or by a fleet of VM instances. In some examples, one or more workloads may be supported by a fleet of VM instances that are scalable to support increases and decreases in use, and may be placed behind one or more load balancing devices of the service provider network. In such examples, the techniques described herein may be applicable to all VM instances in a fleet that support various instances of the same workload.

This application describes techniques that increase the overall utilization of computing resources provided by servers or other hardware devices, such as CPU, GPU, memory, disk, and/or network availability. The optimization service may determine VM instance types that are more appropriately tailored, or allocated a more appropriate amount of computing resources, to support for workloads. In this way, the techniques described herein help prevent underutilization of computing resources of a service provider network, which reduces the amount of computing resources that are (i) allocated or reserved for VM instances, but (ii) sit idle or unused because the VM instances are oversized for the workload they support. Additionally, the techniques improve the performance of workloads by intelligently placing workloads on VM instance types that are computationally biased or optimized to support the workloads. The optimization service may place the workloads on VM instances to help ensure that the workloads have sufficient amounts of computing resources available, of the types of computing resources needed, to help avoid over constrained VM instance types and workloads.

Although the techniques described herein are with reference to virtual machines or VM instances and virtual machine types, in some examples, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, processes, software, and/or any other executable that is allocated portions of physical computing resources.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which an optimization service of a service provider network determines and recommends VM instance types that are optimized to support workloads on behalf of users. Further, the optimization service provides the users with options to test the recommended VM instance types prior to migrating fleets of workloads onto the recommended VM instance types.

As illustrated, a service provider network 102 may be operated and/or managed by a service provider. The service provider network 102 may provide various services to users 106 to fulfil their computing resource needs, such as cloud-based computing resources. For example, the service provider network 102 may provide cloud-based, scalable, and network accessible compute power services, storage services, database services, and/or other services. Users 106 may utilize user devices 108 to subscribe for use of the computing resources and/or services provided by the service provider network 102. The service provider network 102 may include an optimization service 104 that is configured to select VM instance types to support workloads of the users 106 which optimize performance of the workloads, and refrain from underutilization or overutilization of the computing resources that support the VM instances and workloads.

The service provider network 102 may span across different geographic regions, and include or be associated with a computing resource network 110 that includes clusters of managed computing devices 112 (e.g., servers) stored in data centers located across the different geographic regions. In this way, users 106 who have subscribed for use of the network-based services supported by computing resources in the data centers need not invest in and maintain the computing infrastructure required to implement the various services that they may need. In some examples, users 106 of the service provider network 102 may access or utilize computing resources of the computing devices 112 in the data centers located in different geographic regions such that users 106 located in these different geographic regions are provided with access these resources and services.

Generally, the computing devices 112 may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The computing devices 112 may be various types of computing devices, such as devices that have different chip set generations, are from different vendors, have different hardware architectures, and so forth.

Thus, the computing resources of the computing-resource network 110 provided by the computing devices 112 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware computing devices 112 may implement or communicate with a virtualization layer and corresponding virtualization systems (e.g., a hypervisor on a server), whereby the compute resources are represented by, and made accessible as, virtual computing resources, such as instances of virtual machines or "VM instances." A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

As illustrated, the computing devices 112 may each support VM instances that may be different types of VM instances provided by the service provider network 102. For instance, computing devices 112(1) may support one or more VM instances 114(1)-114(N) that are of a particular VM instance type. Rather than allocating all the computing resources of an entire computing device 112 to support a workload 116 for the user 106, the service provider network may include a virtualization layer (e.g., containing one or more hypervisors) that includes instances of "virtual" computing resources (also referred to interchangeably herein as "virtual machines" or "VM instances") that represent the allocated portions of the physical computing resources of the computing devices 112. These VM instances 114 may emulate computing devices 112 to operate and support workloads, and may have their own operating systems, processing capabilities, storage capacity, and network connections or interfaces.

Users 106 may create user accounts with the service provider to utilize the resources and services of the service provider network. The users 106 may utilize their user devices 108 to communicate over one or more networks 118 (e.g., WANs, PANs, LANs, etc.) with the service provider network 102. The user devices 106 may comprise any type of computing device configured to communicate over network(s) 118, such as mobile phones, tablets, laptop computers, desktop computers, televisions, servers, and/or any other type of computing device. The users 106 may desire that the service provider network 102 host or support workloads 116 on the computing-resource network 110 that is managed by the service provider. Accordingly, the users 106 may, via their user account, request that a workload be launched on their behalf, and provide input data 120 via one or more user portals 122 (e.g., web console, command line interface (CLI), application programming interface (API), etc.). The user portals 122 may provide the input data 120 to the optimization service 104 which includes a recommendation engine 124, an optimization component 126, and a VM instance type library 128 storing indications of different VM instance types 130(1)-130(N) offered by the service provider network.

As described herein, a workload 116 may generally include a designated collection or grouping of computing resources (e.g., compute, memory, storage, networking, etc.) in the computing-resource network 110, and the code or logic that performs functionality using the computing resources. The service provider network 102 may support a wide variety of workloads 116, such as web servers, databases, customer-facing applications, distributed data stores, batch processing, machine/deep learning training and/or inference, online gaming, video encoding, memory caching, and/or any other type of workload that can be supported by computing resources of the computing-resource network 110.

The user 106 may provide input data 120 that generally indicates characteristics of the workload 116 that is to be hosted or supported on behalf of the user's account, such as a desired operating system for the workload 116, a deployment package of the workload 116, and so forth. In some instances, the optimization service 104 may provide a wizard that is accessible to the user 106 via their user account and presents, via the user portal(s) 122, user interfaces to the user device 108 that are configured to receive the input data 120 that defines that user's workload 116.

The optimization service 104 includes the optimization component 126 that is configured to determine one or more VM instance types 130 that are optimized to support the workload 116 on behalf of the user 106. The service provider 102 may offer a wide variety of VM instance types 130 that differ based on (i) the amounts of physical computing resources allocated for use by the VM instance type 130, and/or (ii) the combinations of the types of physical computing resources allocated for use by the VM instance type 130. In some instances, there may be at least five high-level categories or types of computing resources included in the computing-resource network 110 and provided by the computing devices 112, which are CPU, GPU, memory, storage, and network throughput. The different VM instance types 130 are allocated different amounts and/or combinations of these, and potentially other, computing resources. For example, the VM instance types 130 may be allocated use of larger or smaller amounts of the different resource types to be computationally biased or optimized support workloads 116 with various computing resource utilization characteristics.

Generally, the optimization service 106 may recommend optimal compute resources for users' workloads to reduce costs and improve performance by using machine learning to analyze historical utilization metrics. Over-provisioning compute can lead to unnecessary infrastructure cost and under-provisioning compute can lead to poor application performance. The optimization service 106 may help users choose optimal instance types, including those that are part of an auto scaling group, based on utilization data. By applying the knowledge drawn from running diverse workloads in the cloud (or service provider network 102), the optimization service 106 identifies workload patterns and recommends optimal compute resources. The optimization service 106 analyzes the configuration and resource utilization of a user's workload to identify dozens of defining characteristics, for example, if a workload is CPU-intensive, or if it exhibits a daily pattern or if a workload accesses local storage frequently. The optimization service 106 processes these characteristics and identifies the hardware resource headroom required by the workload. The optimization service 106 infers how the workload would have performed on various hardware platforms (e.g. VM instances types) and offers recommendations. Users can opt-in to the optimization service 106 via a console.

For example, the VM instance types 130 can include compute optimized types, memory optimized types, accelerated optimized types, storage optimized types, and/or network throughput optimized types. As a specific example, a VM instance type 130 that is compute optimized may be allocated use of 4 vCPUs of 3.0 GHz processors where each core can run at up to 3.5 GHz, but only be allocated 8 gibibytes (GiB) of memory. Conversely, a VM instance type 130 that is memory optimized may be allocated 32 GiB of memory, but only run on a 3.1 GHz processor with 2 vCPUs.

In addition to biasing the VM instance types 130 by varying the amounts or ratios of computing resource types allocated for use by the different VM instance types 130, the service provider may further include different sizes of VM instance types 130 for workloads 116 that require more or less computing resources at various ratios. For example, a smaller VM instance type 130 that is computationally biased may be allocated 2 vCPUs of a 3.0 GHz processor and 4 GiB of memory, and an extra-large VM instance type 130 that is computationally biased may be allocated 72 vCPUs on the 3.0 GHz processor and 144 GiB of memory (e.g., 36× the vCPUs and memory allocation of the smaller type).

Accordingly, the service provider may offer a wide selection of VM instance types 130 that are included in a VM instance type library 128 in which a user 106 can search and select a desired VM instance type 130 for their workload 116. Traditionally, the users 106 would have to mentally map out the computing resource needs of their workload 116 and peruse the library 128 offering of VM instance types 130 to locate a VM instance type 130 that seems appropriate for their needs. However, not only is this time consuming, but it may also result in users 106 having their workloads hosted on VM instance types 130 that are either overutilized and resource constrained, or underutilized and resulting in computing resources that may be unused and sitting idle.

The optimization component 126 may be configured to determine one or more VM instance types 130 that are optimized to host or support the workload 116. For example, the optimization component 126 may generally map resource-utilization data 13, of the workload 116 to one or more VM instance types 130 that are computationally biased, or optimized, to support the resource utilization of the workload 116. In some examples, and described in more detail with respect to FIG. 2, the optimization component 126 may generate predefined workload categories or groups that generally represents higher-level categories of workloads 116 commonly hosted on the computing-resource network 110. For example, one workload category may be a database category and represent different database workloads supported by the computing-resource network 110. Another category may be a web-server category and represent the different web-server workloads supported by the computing-resource network 110. The optimization component 126 may analyze the different types of workloads 116 supported across the computing-resource network 110 on behalf of the user accounts and define (e.g., machine learning, clustering, etc.) a set of workload categories that are generally representative of the different workloads 116 supported by the computing-resource network 110.

Further, the optimization component 126 may determine one or more resource-utilization models for each workload category that represent the general "shape" or characteristics of the resource utilization by the workloads 116 represented in each category. That is, each workload category may be associated with one or more resource-utilization models that are generally representative of the resource consumption by workloads 116 in the workload category. The optimization component 126 may further determine, based on the resource-utilization models (or by user account selection) which of the VM instance types 130 are computationally biased or optimized for the different workload categories. As an example, VM instance type 130 that are compute optimized may be associated with a high-performance web server workload category, whereas a VM instance type 130 that is memory optimized may be associated with a higher-performance database category. In this way, workload categories may be generated or predefined that are representative of the resource-utilization characteristics for the workloads 116 that are supported by the computing-resource network, and also indicate the VM instance types 130 that are optimized or biased to support the workloads for each workload category.

The optimization component 126 may map the resource-utilization data 132 to at least one of the predefined workload categories in various ways. For instance, the resource-utilization data 132 of the workload 116 may be mapped by the optimization component 126 to a workload category. After the optimization component 126 maps the resource-utilization data 132 to one of the predefined workload categories, the recommendation engine 124 may provide recommendation data 132 to the user device 108 that includes at least a recommendation of a VM instance type 130 that is optimized to support their workload 116.

The recommendation engine 124 may determine one or more of the VM instance types 130 associated with the workload category, and may further rank the VM instance types 130 based on how strongly the resource-utilization data 132 corresponds to one of the VM instance types 130 for that workload category. Depending on the size (e.g., amount of resources), and/or the combination of computing resources, for the workload 116, the recommendation engine 124 may provide a ranked listing of VM instance types 130 that are recommended for the workload data 120. In some examples, the recommendation engine 124 may further provide suitability data that indicates how suitable the recommended VM instance types 130 are for supporting the workload 116, such as indicating a number of stars out of five stars, percentages indicating how suitable out of one-hundred percent, and/or any other suitability score or indicator. Further, the recommendation engine 124 may provide a textual explanation regarding why the VM instance types 130 are optimized to support the workload 116 such that the user 106 may make a more intelligent decision as to which of the VM instance types 130 they would like to launch their workload 116 on. The VM instance recommendations 138 may be presented in a dashboard 136 accessible via the user portal(s) 122, and the user 106 may select between testing or using the VM instance type 130 on which they would like to launch their workload 116.

The optimization service 104 may receive input data 120 indicating a selection of one or more of the recommended VM instance types 130 that the user 106 would like to test. The optimization service 104 may then provide a compute-management service 140 with an instruction to launch a test 142 for the selected VM instance types(s) 130 that the user 106 would like to test. In some examples, the compute-management service 140 may be provided with parameters associated with the workload and or the operating environment in the computing-resource network 110. For instance, the compute-management service 140 may be provided with parameters of the computing-resource network 110 such as implemented load balancers, virtual private networks, and so forth. Further, the optimization service may obtain the deployment package of the workload 116 as well as the operating system (and/or other data) associated with running the workload, and deploy the test workload onto a test VM instance type.

The compute-management service 140 may use the parameters of the computing-resource network that is supporting the VM instances 114 that are hosting the workloads 116 to establish a testing environment 144 having the same or similar parameters. The testing environment 144 may be supported by computing devices 112(2), and may support one or more test VM instances 146(1)-146(N) that are running test workloads 148. The test VM instances may represent the VM instance types 130 that were recommended in the recommendations 138, and selected by the user 106 for testing. The test workload 148 may correspond to the workload 116 in that the same code and/or deployment package is used to launch the test workloads 148 on the test VM instances 146. The test VM instances 146 may be a single instance, multiple test VM instances 146 of a same type, or different VM instance types 130 that are being tested for hosting the test workload 148. The test load balancer(s) may load balance traffic (e.g., real traffic, duplicate traffic, simulated traffic, etc.) among one or more test VM instances 146 that are running test workloads 148 for a period of time in order to determine how well the test VM instances 146 perform for hosting the test workload 148.

Although not illustrated, in some instances the compute-management service 140 may simply provision a test VM instance 146 behind a load balancer in the computing-resource network 110 to host a test workload 148 that handles real traffic. In another example, the test VM instance 146 may receive traffic flows that have been duplicated from real traffic flows such that the test workload 148 running on the test VM instance 146 does not affect the actual production of the fleet of VM instances 114 running the workload 116 of the user 106.

In some examples, the test workload 148 may include code provided by the user 106, and/or generated by the service provider network 102, to implement functionality of the desired workload 116. For example, the service provider network 102 may provide services that generate code for the test workload 148, including an application stack and/or other programs, to implement the test workload 148. The test workload 148 may be supported by one test VM instance 146, and/or a fleet of test VM instances 146. In some examples, one or multiple test VM instances 146 in a fleet of test VM instances 146 may support respective test workloads 148 on behalf of the user account of the user 106. The compute-management service 140 may further deploy one or more test load balancers in front of the fleet of test VM instances 146 to scale the test workload(s) 148, and other configurations or devices (e.g., security groups) to support the test workload 148.

The optimization service 104 may monitor the performance of the test workloads 148 running on the test VM instances 146. For instance, the optimization service 104 may collect resource-utilization data 132 for the test workloads 148 and/or test VM instances 146. The resource-utilization data 132 may indicate at least the usage of the computing resources allocated to the test VM instances 146 by the test workloads 148 over the period of time. The optimization service 104 may determine performance data 150 indicating a performance metrics of the test VM instances 146 for hosting the test workloads 148, such as percentages of the allocated resources utilized by the test workloads 148, data throughput compared to computing resources allocated to the test VM instances 146, error rate, packet drops, latency, and/or other metrics indicative of performance of the test VM instances 146 when hosting the test workloads 148.

The optimization service 104 may provide the performance data 150 to the user devices 108, and the user devices 108 may output performance metrics 152 indicating the performance of the test VM instances 146 for hosting the test workloads 148. In some instances, the performance metrics 152 may also indicate the performance of the current VM instances 114 hosting the workloads 116 in the production fleet so the user 106 can compare the performances of the current VM instances 114 and the test VM instances 146.

Generally, the optimization service 104, and components thereof, may comprise software, firmware, and/or other logic that is supported one computing device, or across more computing devices in the service provider network 102. Additionally, the optimization service 104 may comprise a system of other devices, such as software agents stored locally on VM instances.

Figure 2:
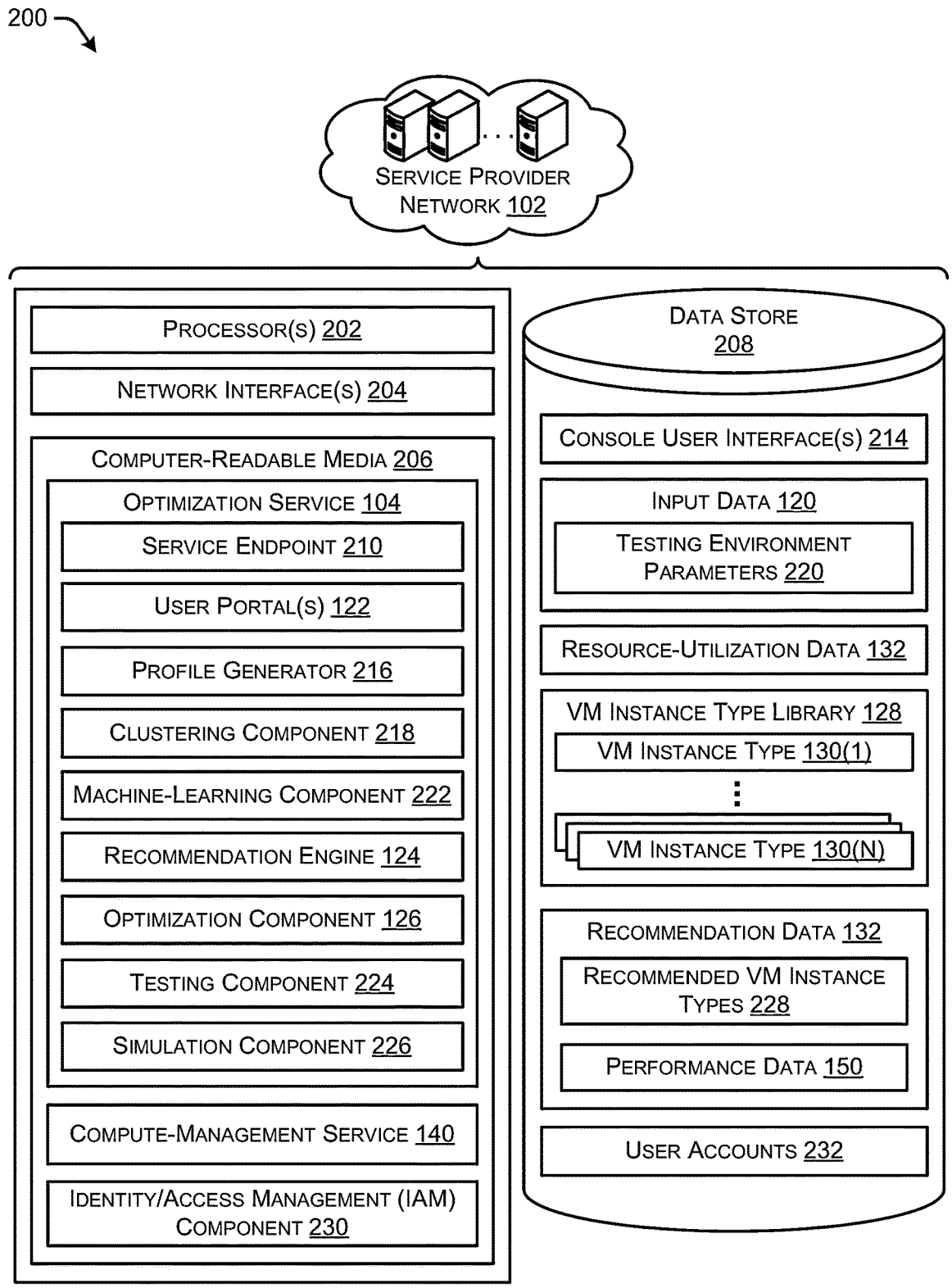
FIG. 2 illustrates a component diagram of example components of a service provider network that help optimize the selection, testing, and utilization of VM instance types to support workloads on behalf of users.

FIG. 2 illustrates a component diagram 200 of example components of a service provider network 102 that help optimize the selection, testing, and utilization of VM instance types 130 to support workloads 116 on behalf of users 106.

As illustrated, the service provider network 102 may include one or more hardware processors 202 (processors), one or more devices, configured to execute one or more stored instructions. The processor(s) 202 may comprise one or more cores. Further, the service provider network 102 may include one or more network interfaces 204 configured to provide communications between the service provider network 102 and other devices, such as the user device(s) 108, computing devices 112, and/or other systems or devices in the service provider network 102 and/or remote from the service provider network 102. The network interfaces 204 may include devices configured to couple to personal area networks (PANs), wired and wireless local area networks (LANs), wired and wireless wide area networks (WANs), and so forth. For example, the network interfaces 204 may include devices compatible with Ethernet, Wi-Fi, and so forth.

The service provider network 102 may also include computer-readable media 206 that stores various executable components (e.g., software-based components, firmware-based components, etc.). In addition to various components discussed in FIG. 1, the computer-readable-media 206 may further store components to implement functionality described herein. While not illustrated, the computer-readable media 206 may store one or more operating systems utilized to control the operation of the one or more devices that comprise the service provider network 102. According to one embodiment, the operating system comprises the LINUX operating system. According to another embodiment, the operating system(s) comprise the WINDOWS SERVER operating system from MICROSOFT Corporation of Redmond, Wash. According to further embodiments, the operating system(s) can comprise the UNIX operating system or one of its variants. It should be appreciated that other operating systems can also be utilized.

Additionally, the service provider network 102 may include a data store 208 which may comprise one, or multiple, repositories or other storage locations for persistently storing and managing collections of data such as databases, simple files, binary, and/or any other data. The data store 208 may include one or more storage locations that may be managed by one or more database management systems.

The computer-readable media 206 may store portions, or components, of the optimization service 104 described herein. For instance, the computer-readable media 206 may store a service endpoint 210 that may include a stack that supports internet routable APIs to describe, generate, delete, and make recommendations using resource-utilization data 132 or characteristics. Generally, this service stack of the service endpoint 210 may support APIs, CLI, consoles, SDKs, and/or any other function through which the components of the optimization service call, and/or the user devices 108.

The computer-readable media 206 may further store the user portal(s) 122 through which users 106 can provide input via their user accounts and user devices 108. In some examples, the user portal(s) 122 include an interface through which users 106 can upload parameters for their testing environments 144. Additionally, the user portal(s) 122 may present one or more console user interface(s) 214 (or UIs 214) through which the users 106 may provide input data 120 that defines or describes their testing environment 144, test VM instances 146, and/or test workloads 148. The user portal(s) 122 may receive calls from APIs, CLIs, SDKs, and/or other electronic means or methods.

The computer-readable media 206 may further store a profile generator 216 that generates a snapshot of profiling data, such as a resource-utilization characteristic included in the resource-utilization data 132, at regular intervals. The profile generator 216 may then utilize these snapshots to create a resource fingerprint for a workload 116, which generally represents the resource consumption of the workload 116. These fingerprints or profiles may be included in the resource-utilization data 132 and be mapped to VM instance types 130 and/or workload categories for the workload 116. The profile generator 216 may further accumulate and average all resource-utilization data 132 for a fleet of VM instances 114 in order to generate a consumption fingerprint for a fleet of VM instances 114.

The computer-readable media 206 may further store a clustering component 218 configured to create or generate the workload categories. The clustering component 218 may obtain historical (or near-real time) utilization data 132 and cluster the workloads 116 for some or all of the user accounts of the service provider network 102 to generate the workload categories that are generally representative of all the workloads 116 in the service provider network 102.

The computer-readable media 206 may further store a machine-learning (ML) component 222 configured to generate the resource-utilization models for each of the workload categories. The ML component 222 may perform various techniques, and utilize various ML algorithms, to train one or more resource-utilization models that represent resource-utilization characteristics representative of the workloads 116 in each workload category 220. In this way, when a new workload 116 needs to be categorized for purposes of identifying optimized VM instance types 130, the resource-utilization data 132 for a workload 116 may be mapped to the resource-utilization model that is "closest" or "most near" (e.g., neural network models) the fingerprint of the resource-utilization data 132 for the workload 116. The ML component 222 may utilize any type of ML algorithm or technique to train the resource-utilization models.

The computer-readable media 206 may further store the optimization component 126 configured to perform techniques described above for mapping resource-utilization data 132 to the appropriate workload categories, such as machine-learning methods or ruled based methods. For example, the optimization component 126 may compare utilization by the workload 116 for one or more dimensions of compute (e.g., CPU, GPU, memory, disk, and/or network throughput) with the resource-utilization models to identify closest match across the one or more dimensions of compute. The optimization component 126 may further determine which of the VM instance identifiers are associated with the workload categories, and provide the user(s) 106 with indications of the optimized VM instance types 130 that are optimized for their workload 116.

The computer-readable media 206 may further store the recommendation engine 124 that is configured to generate and provide recommendation data 132 to the user device 108 to provide VM instance recommendations 138 on which to launch and/or test workloads 116, and also to continue to monitor test workloads 148 to determine performance data 150 for the test VM instances 146. The recommendation engine 124 may generate recommendation data 132 including a VM instance type listing (e.g., ranked list of VM instance types 130 based on suitability for the workload 116), suitability/risk scores that indicate how suitable or optimized a VM instance type 130 is for the workload 116, and/or a textual explanation that details why a VM instance type 130 is optimized for the workload 116. The recommendation engine 124 may, if the user 106 opts in for a recommendation, provide recommendation data 132 to the user devices 108 to help users 106 select a VM instance type 130 on which to launch a workload 116.

The computer-readable media 206 may further store a simulation component 226 that simulates workloads 116 on VM instances 114. For instance, rather than using test VM instances 146 to generate actual resource-utilization data 132, the simulation component 226 may simulate consumption by different workloads 116 on different VM instance types 130 in order to determine what workloads 116 are optimized for what VM instance types 130 (e.g., throughput compared to allocated computing resources). Additionally, the simulation component 226 may simulate workloads 116 on new VM instance types 130 that have been introduced by the service provider for use by the users 106. For example, the simulation component 226 may simulate the consumption of different workloads 116 on the new VM instance types 130, and determine performance metrics that indicate throughput of data for amounts of computing resources input into the new VM instances 114. In this way, when a new VM instance type 130 is offered to users 106, the optimization service 104 may still determine what workload categories, and thus what workloads 116, would benefit from being migrated and/or launched on the new VM instance type 130.

The simulation component 226 may utilize one or more simulation VM instances on one or more computing devices 112 to simulate the different workloads 116 using simulation workloads. The simulation component 226 may provision, deploy, and monitor the simulation VM instance that corresponds to a recommended VM instance type 138, and simulate various workloads using a simulation workload. In some examples, the simulation workload may be a simulator program that is configured to consume designated amounts of computing resources such that the simulation component 226 can mimic actual workloads 116. The simulation component 226 can then receive the simulation data in order to determine how well VM instance recommendations 138 performed for the workloads 116 (e.g., throughput compared to allocated computing resources). Thus, the simulation component 226 may simulate the consumption of different workloads 116 (e.g., simulation workload 148) using a simulation program on the new VM instance types 902, and determine performance metrics that indicate throughput of data for amounts of computing resources input into the new VM instance type 902.

The simulation workload may comprise at least one process that is configurable to consume different amounts of computing resources of the computing devices 112. For instance, the simulation component 226 may drive compute utilization that is equivalent to how different workloads 116 look or consume. The simulation component 226 may scale the consumption of the different compute dimensions by scaling up or down the amount of computing resources consumed. For example, the simulation workload may read or write an amount of data to disk, consume CPU and memory using processes, send data over networks, and so forth to simulate target consumption to test various workloads 116. The simulation component 226 may then determine which of the VM instance recommendations 138 are optimized for the workloads 116.

The computer-readable media 206 may further store a testing component 224 configured to launch and/or manage test workloads 148 on test VM instances 146 prior to migrating the workloads 116. For example, the testing component 224 may allocate computing devices 112(2) to support test VM instances 146. Using these test VM instances 146, the testing component 224 may determine whether a test workload 148 actually performs well, or is further optimized, when placed on a new VM instance type 130 as compared to a current VM instance type 130. For example, the testing component 224 may "spin up" or provision a test VM instance 146 corresponding to a VM instance type 130 that the optimization component 126 has determined is optimized for a workload 116. Prior to (and/or subsequent to) recommending the new VM instance type 130 to a user 106, the testing component 224 may test the workload on the test VM instance 146 and receive health data and/or performance data indicating how well the test workload 148 is performing. Based on the health/performance data, the testing component 224 can provide insight to the users 106 regarding whether or not the new VM instance types 130 are in fact optimized compared to the current VM instance type 130 for the workload 116.

The computer-readable media 206 may further store code for the compute-management service 140, which may be implemented by one, or multiple, computing devices 112 of the service provider network 102. Generally, the compute-management service 140 may be a service of the service provider network 102 that provides secure, resizable compute capacity and manages the computing resources of the computing-resource network 110. The compute-management service 140 may be referred to in various implementations as an elastic compute service, a virtual machines service, a computing cloud service, a compute engine, or a cloud compute service. In some examples, the compute-management service 140 may perform various functions for managing the computing-resource network 110, such as provisioning VM instances 114, migrating workloads 116 between VM instances 114/146, providing auto-scaling for fleets of VM instances 114, configuring VM instances 114 and/or workloads 116, and/or performing any other functions for managing the computing-resource network 110. In some instances, the compute-management service 140 may receive commands from the optimization service 104 for managing the workloads 116 to new VM instance types 130 for users 106 of the service provider network 102.

In some examples, the compute-management service 140 may include an auto-scaling component that, when executed by the processor(s) 202, scales up or down the number of instances 114 available to support one or more workloads 116 (and/or instances 146 to support test workloads 148). For example, the auto-scaling component may provide a fast, efficient, and accurate way to match fleet capacity to usage. In some examples, the auto-scaling component may track the fleet's hosting metrics and determine when to add or remove instances 114 based on a set of guidelines, called policies. The auto-scaling component can adjust capacity in response to changes in demand to help ensure that the fleet of instances 114 has availability for bursts without maintaining an excessive amount of idle resources.

To utilize the services provided by the service provider network 102, users 106 may register for an account with the service provider network 102. For instance, users 106 may utilize a user device 108 to interact with an identity and access management (IAM) component 230 that allows the users 106 to create user accounts 232 with the service provider network 102. Generally, the IAM component 230 may enable the users 106 to manage their workloads 116/148 and other computing resources securely. Using the IAM component 230, the users 106 may manage their VM instances 114/146 as described herein. Additionally, users 106 may perform various operations for interacting with the optimization service 104 via their user accounts 232, such as providing input data 120, receiving recommendation data 132, proving input data indicating selections of VM instance types 130, and/or other interactions may be authorized via credentials required to access the user accounts 232.

The computer-readable media 206 may be used to store and retrieve information, such as program modules, data structures, or other data. It should be appreciated by those skilled in the art that computer-readable storage media is any available media that provides for the non-transitory storage of data and that can be accessed by the service provider network 102. In some examples, the operations performed by the service provider network 102, and or any components included therein, may be supported by one or more server devices. Stated otherwise, some or all of the operations performed by the service provider network 102, and or any components included therein, may be performed by one or more computer devices operating in a cloud-based arrangement.

By way of example, and not limitation, computer-readable storage media 206 can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
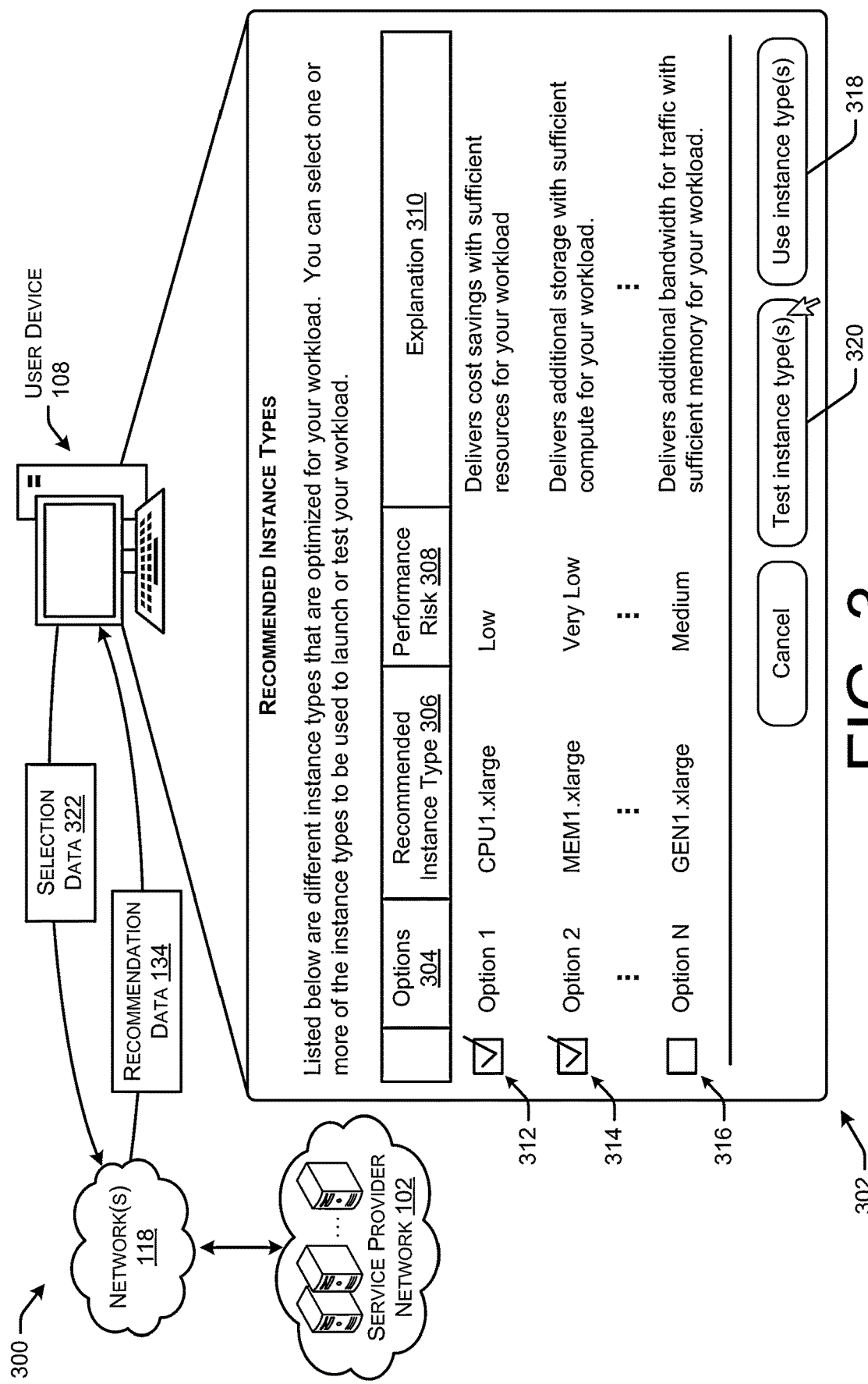
FIG. 3 illustrates a graphical user interface through which a user of a service provider network can request that their workload be tested on a recommended VM instance type prior to using the recommended VM instance types to host their fleet.

FIG. 3 illustrates an environment 300 including a graphical user interface (GUI) 302 through which a user 106 of a service provider network 102 can request that their workload 116 be tested on a recommended VM instance type 138 prior to using the recommended VM instance type 138 to host their fleet. The GUI 302 may be presented on a user device 108, and accessible via a user account 232 and a console 122. In some examples, the GUI 302 may assist the user 106 in selecting an optimized or appropriate VM instance type 130 for their workload 116. The GUI 302 (potentially along with other user interfaces) may provide the users 106 with enough information for them to make a decision regarding a VM instance type 130 that is appropriate for their workload 116.

The GUI 302 may include a list of options 304 indicating different VM instance types 130 that have been identified as being optimized for hosting their workload 116. The options 304 may be each be associated with respective recommended instance types 306 that indicate what VM instance type 130 their workload 116 is recommended to be hosted. Each recommended instance type 206 may further be associated with respective performance risks 308 that indicate how risky each of the recommended VM instance types 306 would be for hosting the workloads 116. The performance risks 308 generally indicate likelihoods that performance of the workload 116 would suffer when hosted on the recommended instance types 206 (e.g., low data throughput compared to resource allocation, throttling of resources, etc.). The recommended VM instance types 306 may additionally be associated with respective explanations 310 indicating why the different recommended VM instance types 306 are being recommended for hosting the workloads 116.

Using this recommendation data 132, the user 106 can make a more informed decision as to what VM instance type 130 to utilize to support their workload 130, check a box next to the VM instance type 130 they desire, and further provide input into different selectable options. For instance, the user 106 may select a first option 318 to use the instance type(s) that were checked by the user. Upon selecting the first option for using the instance types, selection data 322 may be sent from the user device 108, over the network(s) 118, to the service provider network 102 to indicate that the user 106 is requesting to have their workload 116 launched or supported by the selected recommended instance types 306.

In other examples, the user 106 may instead select a second option 320 for testing the instance types. Upon selecting the instance type, selection data 322 may be sent from the user device 108, over the network(s) 118, to the service provider network 102 to indicate that the user 106 is requesting to launch test VM instance types 146 corresponding to the selected recommended instance types 306 in order to host test workloads 148. In such examples the selection data 322 may be sent to the service provider network 102 after receiving the selection of the second option 320 (e.g., "one-click"), and the service provider network 102 may automatically establish a testing environment to test the selected recommended instance types 306.

It should be understood that the GUI 302 is merely illustrative and any type of user interface, or combination of user interfaces, may be utilized to prompt a user 106 for selecting recommended instance types 306 to use and/or to test. Additionally, any type of input mechanism may be used to receive input that can be used to make selections.

Figure 4:
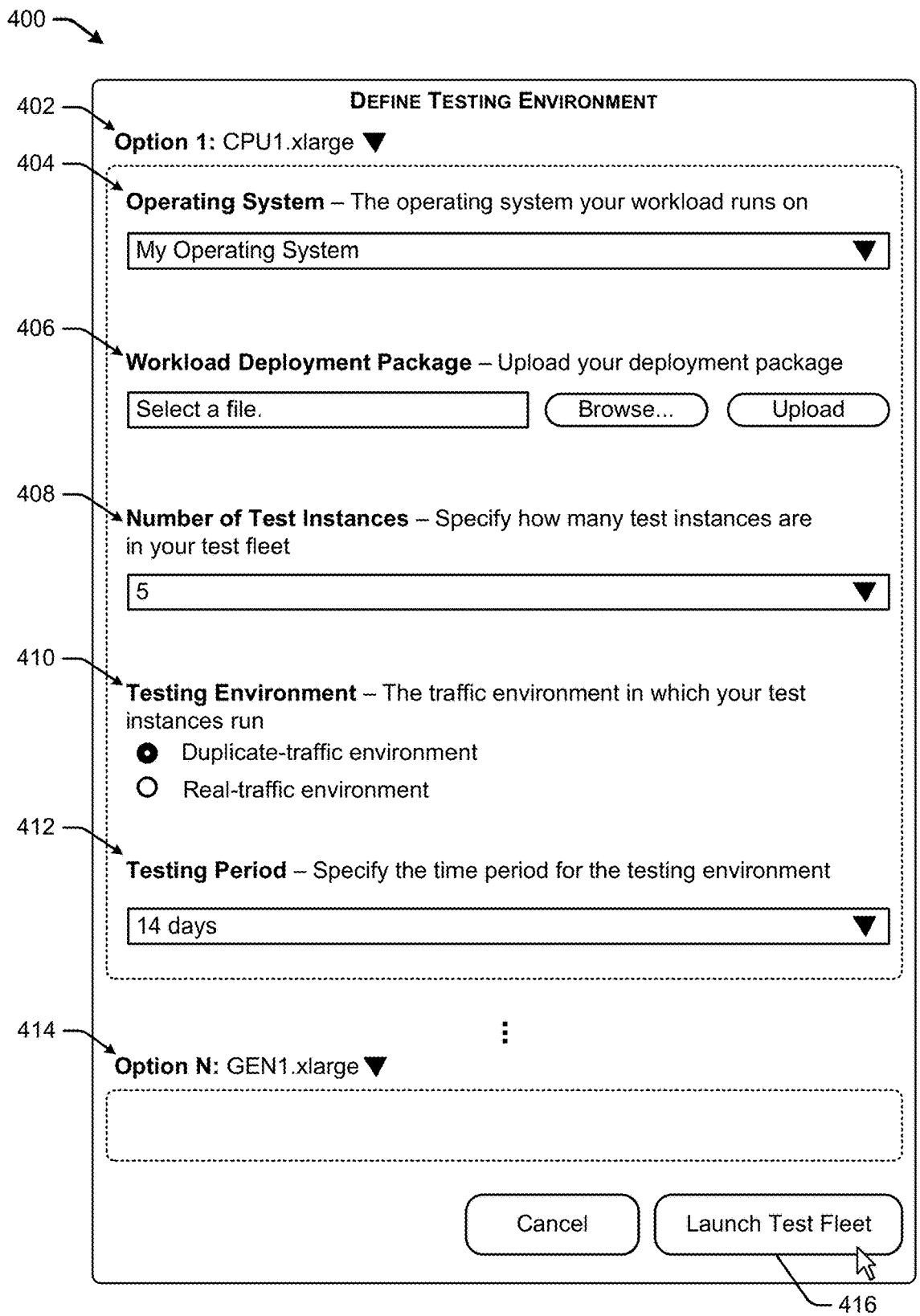
FIG. 4 illustrates a graphical user interface through which a user of a service provider network can define parameters for the testing environment in which recommended VM instance types are to be tested against the user's workload.

FIG. 4 illustrates a GUI 400 through which a user 106 of a service provider network 102 can define parameters for the testing environment in which recommended VM instance types 138 are to be tested against the user's workload 116.

As illustrated, the user 106 may initially define parameters for option 1 402 that was the first VM instance type 130 selected to be tested. The user 106 may provide input data defining the parameters of the testing environment for the option 1 402 VM instance type 130. For instance, the user 106 may utilize a drop-down field to select an operating system 404 that their workload 116 runs on. Additionally, the user 106 may provide a workload deployment packet 406 by selecting one or more files stored in one or more locations. The workload deployment package 406 may be stored in files local to the user device 108 and/or user network, and/or already stored in the service provider network 102. The workload deployment package 406 may include the code, libraries, etc., used for launching and running their workload 116.

The user 106 may be able to define a number of test instances 408 that they would like to test by running test workloads 148. The number of test instances 408 may further dictate the number of test load balancers needed in the testing environment 144. Additionally, the user 106 may provide input indicating a testing environment 410, such as whether the testing environment 144 provides the test VM instances 146 with duplicate traffic or real traffic. In this way, the user 106 may dictate whether the test VM instances 146 receive duplicate traffic flows and do not affect the product fleet, or if the text VM instances 146 are placed in the production fleet and take real-traffic flows.

Further, the user 106 may define a testing period 412, that is, the time period for which they would like to establish the testing environment 144 for their test VM instances 146 running the test workloads 148. After, and potentially during, the testing period 412, the service provider network 102 may provide the user 106 with performance metrics indicating how well the test VM instance 146 (option 1 402) performs when hosting the test workload 148.

After defining the parameters around the testing environment 144 for option 1 402, the user 106 may proceed to define parameters for the remaining options through option N 414, and/or select the option 416 to launch the test fleet of test VM instances 146 as defined for option 1 402.

It should be understood that the GUI 400 is merely illustrative and any type of user interface, or combination of user interfaces, may be utilized to prompt a user 106 for defining parameters of a testing environment 144. Additionally, in some instances the testing component 224 may automatically collect some or all of the data input via the GUI 402 in response to receiving the selection data 322.

That is, the user 106 and/or testing component 224 may have already defined the parameters of the testing environment 144.

Figure 5:
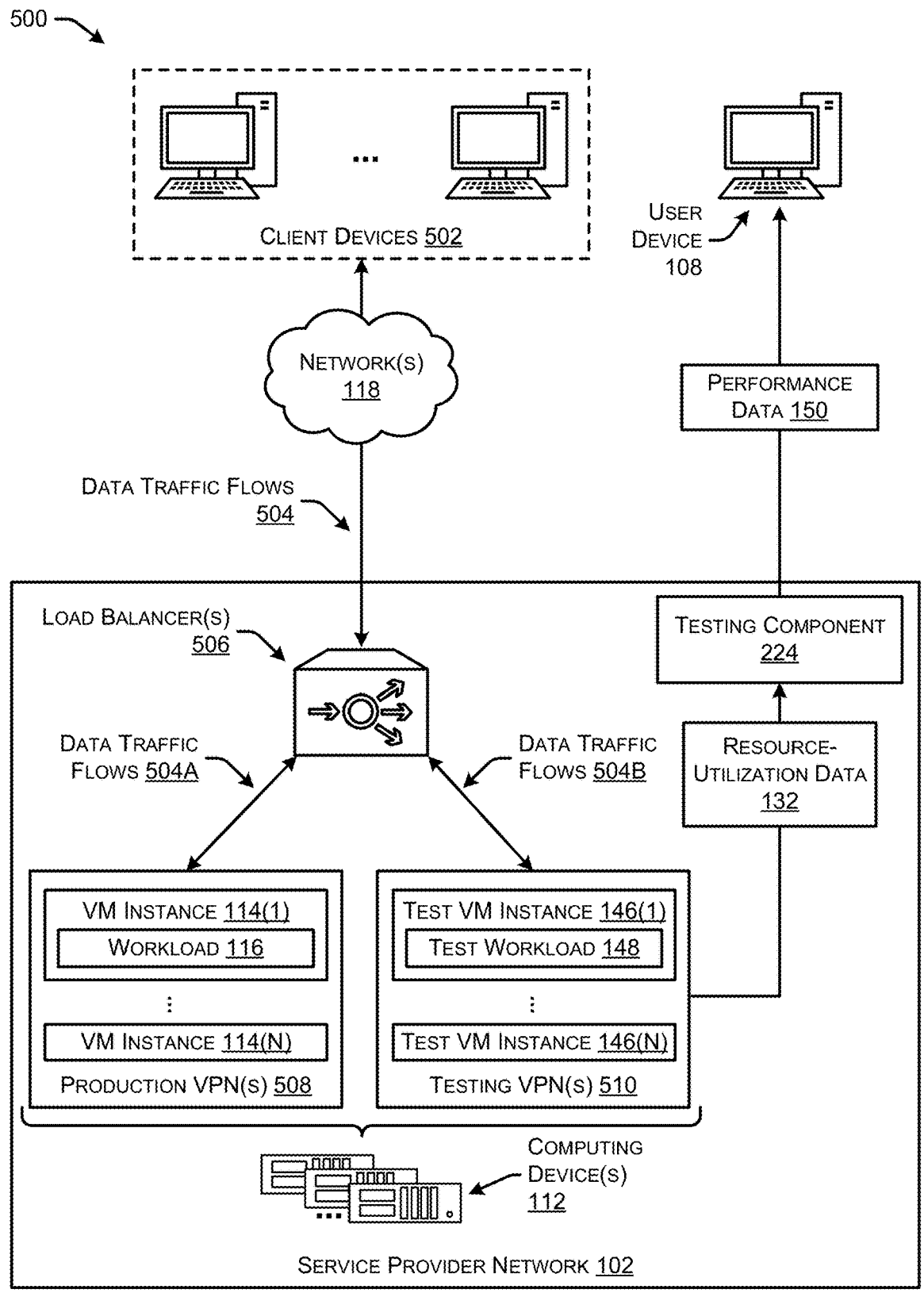
FIG. 5 illustrates a system-architecture diagram of a service provider network that tests workloads on VM instances before migrating fleets of workloads onto new VM instance types, and provides a user with performance data indicating a performance of the VM instances.

FIG. 5 illustrates a system-architecture diagram 500 of a service provider network 102 that tests workloads 148 on test VM instances 146 before migrating fleets of workloads onto new VM instance types, and provides a user 106 with performance data 150 indicating a performance of the test VM instances 146.

As illustrated, one or more client devices 502 may send data traffic flows 504 over the network(s) 118 and to the service provider network 102. The data traffic flows 504 may be different sessions, interactions, operations, requests, etc., that the client devices 502 are having with workloads 116 supporting an application or service associated with the user 106. The service provider network 102 may include one or more load balancers 506 that receive the data traffic flows 504 and balance them among different VPNs and/or VM instances 114 hosting workloads 116.

As illustrated, the service provider network 102 may provide one or more production virtual private networks (VPNs) 508 in which one or more VM instances 114 are hosting the workload 116. Further, according to the techniques described herein, one or more testing VPNs 510 may also be established. The testing VPNs 510 may be included in, or correspond, to the testing environment 144. The testing VPNs 510 may generally be configured the same as the production VPNs 508 and may include one or more test VM instances 146 that are hosting test workloads 148. Thus, the testing VPNs 510 may mimic the production VPNs 508 such that the test workloads 148 experience the same, or similar, running conditions as the workloads 116.

The load balancer(s) 506 may load balancer the data traffic flows 504 such that a first portion of the data traffic flows 504A is provided to the production VPNs 508, and a second portion of the data traffic flows 504B is provided to the testing VPNs 510. In some instances, the second portion of the data traffic flows 504B may be actual traffic from the client devices 502, and in other examples, the second portion of the data traffic flows 504B may be a duplicated version of the first portion of the data traffic flows 504A. The test workloads 148 may service the second portion of the data traffic flows 504B, whether real traffic, duplicated traffic, and/or simulated traffic, and the testing component 224 may obtain resource utilization data 132. The testing component 224 may analyze the resource-utilization data 132 and generate the performance data 150 that indicates a performance of test workloads 148 running on the test VM instances 146. The service provider network 102 may then provide the performance data 150 to the user device 108 for a user 106 to access and analyze.

Figure 6:
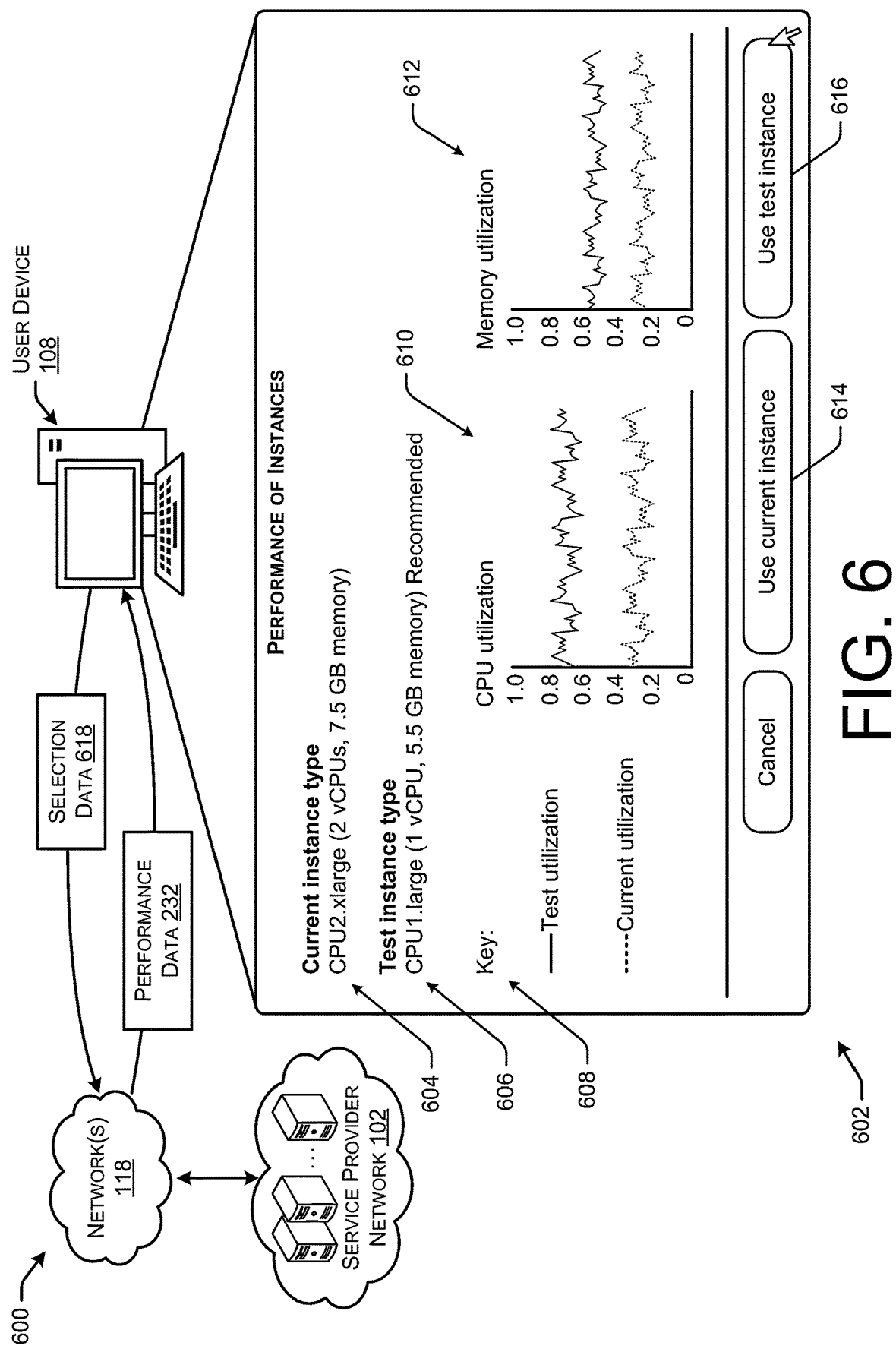
FIG. 6 illustrates a graphical user interface through which a user of a service provider network can review the performance of a recommended VM instance type that was tested for hosting their workload, and determine whether to continue using the current VM instance type or use the recommended instance type that was tested.

FIG. 6 illustrates an environment 600 including a graphical user interface 602 through which a user 106 of a service provider network 102 can review the performance of a recommended VM instance type 138 that was tested for hosting their workload 116, and determine whether to continue using the current VM instance type 130 or use the recommended instance type 138 that was tested.

The user device 108 may receive performance data 232 from the service provider network 102, and display the performance data 232 for the user 106 to view and analyze. The performance data 232 may generally be indicative of a performance of the VM instances that host a workload 116 and a test workload 148. The current instance type 604 is listed, which corresponds to the VM instances 114, and the test instance type 606 is also listed, which corresponds to the test VM instances 146. As illustrated, the GUI 602 may include a key 608 indicating the current utilization of the current VM instances 114 hosting the workload 116, and also the test utilization indicating the utilization of the test VM instance 146 hosting the test workload 148.

The GUI 602 may illustrate the performance of the current VM instance 114 versus the test VM instance 146 for CPU utilization 610, memory utilization 612, and/or other compute resources not illustrated (e.g., disk, network I/O, etc.). As illustrated, the test workload 148 may be utilizing a higher percent of the CPU utilization 610 and memory utilization 612 of the test VM instance 146 compared to the workload 116 running on the current VM instance 114. For instance, the current utilization of the underlying resources allocated to the current VM instance type 114 by the workload 116 may be a less optimal percentage (e.g., roughly 20%-40%) compared to the utilization of the underlying resources allocated to the test VM instance 148 (e.g., roughly 60%-80%).

The user 106 may analyze the performance data 232 indicating the performance of the different VM instance types 130 (e.g., current VM instance and test VM instance). The user 106 may then determine whether they would like to continue using the current instance type 604 and select the first option 614, or if they would like to select the second option 616 and use the test instance type 606. Based on the input, the user device 108 may generate selection data 618 and send the selection data to the service provider network 102. In instances where the user 106 selects the second option 616, the service provider network 102 may receive the selection data 618 and migrate the workloads 116 from being hosted on the VM instances 114 to VM instances that are of the test VM instance type 606.

It should be understood that the GUI 600 is merely illustrative and any type of user interface, or combination of user interfaces, may be utilized to prompt a user 106 for information that indicates their preferred VM instance type 130. Additionally, any type of input mechanism may be used to receive selection data 618 that can be used to define the selection data 618.

In some instances, the testing component 224 may automatically migrate the workloads 116 from the current VM instance 114 to the VM instance type 130 of the test VM instance 146. That is, the user 106 may provide various utilization thresholds or metrics that, if the test VM instance 146 satisfies, then the testing component 224 may determine to automatically migrate the workloads 116 to be hosted on the recommended VM instance type 130. Thus, the user 106 need not interact with the GUI 602 in some instances to use the test instance 146, but may instead provide thresholds or metrics that, if met, allow the testing component 224 to automatically VM instance types 130 of the test VM instance 146. For instance, the user 106 may specify utilization thresholds or ranges that they desire for their workloads 116. For instance, the user 106 may indicate an upper threshold of CPU usage of 80%, and if the workload 116 stays below 80% utilization of the test VM instance 146, then the testing component 224 may determine that the test VM instance 146 is suitable for hosting the workloads 116. The testing component 224 may then automate the process of hosting the workloads 116 on a VM instance type 130 of the test VM instance 146 without receiving further input from the user 106.

FIGS. 7A, 7B, 8, 9A, and 9B illustrate flow diagrams of example methods 700, 800, and 900 that illustrate aspects of the functions performed at least partly by the service provider network 102 as described in this disclosure. The logical operations described herein with respect to FIGS.

7A, 7B, 8, 9A, and 9B may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 7A, 7B, 8, 9A, and 9B and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components.

Figure 7A:
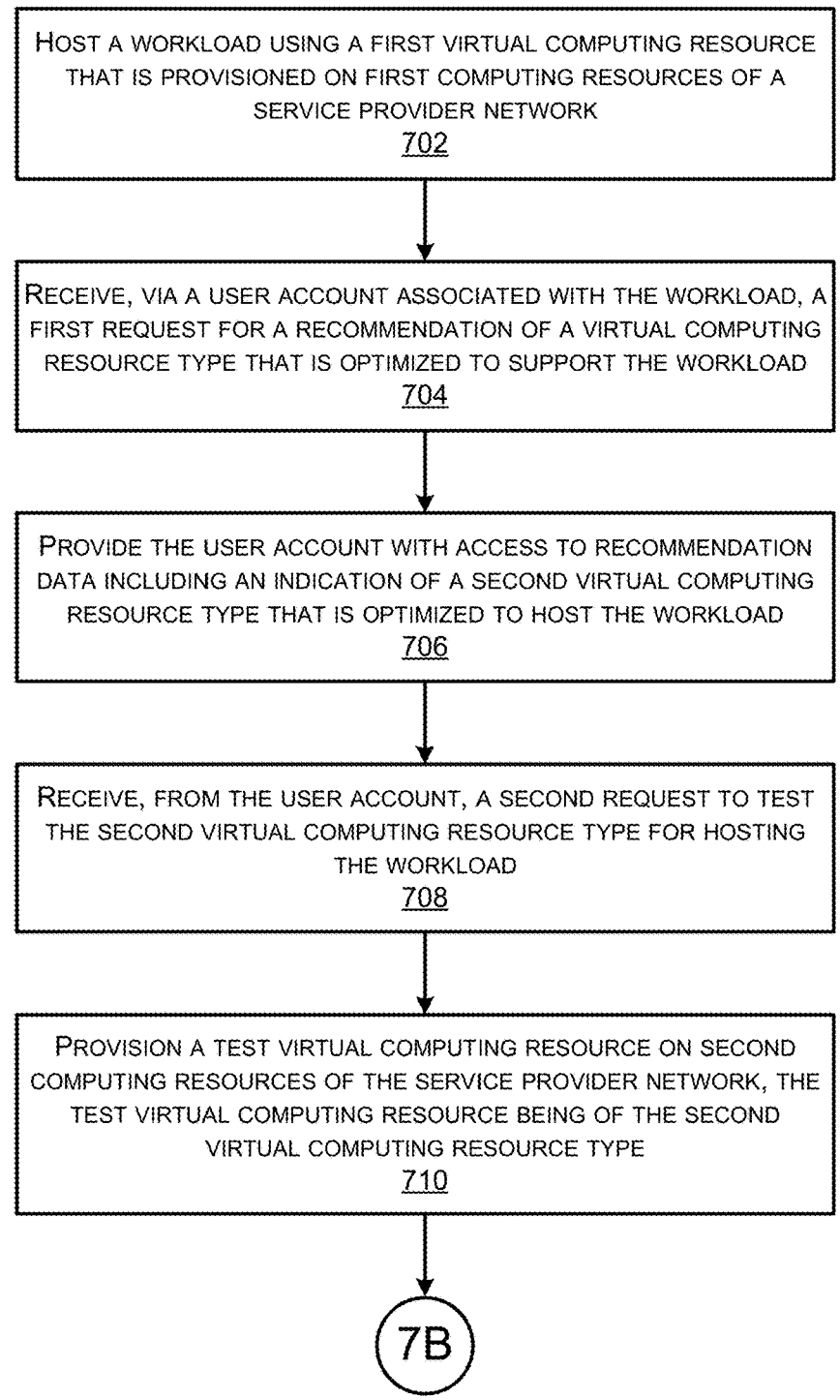
FIGS. 7A and 7B collectively illustrate a flow diagram of an example method for a service provider network to receive utilization data for a workload, provide a recommendation of a VM instance type that is optimized for the workload, and test the recommended VM instance type for the workload.
Figure 7B:
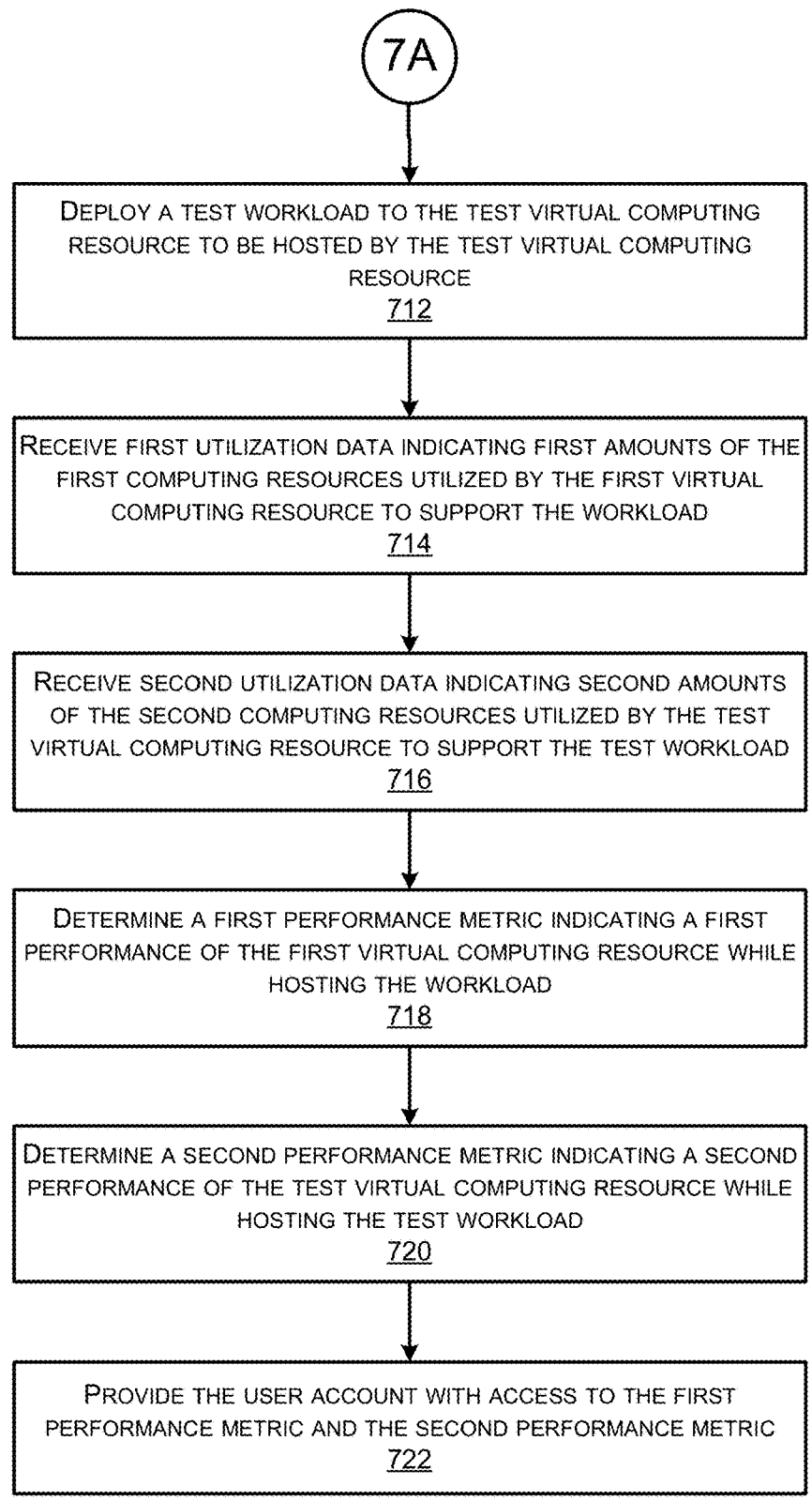

FIGS. 7A and 7B collectively illustrate a flow diagram of an example method 700 for a service provider network 102 to receive utilization data 132 for a workload 116, provide a recommendation of a VM instance type 138 that is optimized for the workload 116, and test the recommended VM instance type 138 for the workload 116. As described herein, a virtual computing resource may comprise one or more of a VM instance, a virtual container, a program, and/or any other virtual representation. In some examples, the techniques of method 700 are performed using a system that includes a computing resource network 110 of a service provider network 102 that is managed by a service provider. The computing resource network 110 may be configured to support different VM instance types 130 configured to utilize different combinations of types of the computing resources to support workloads 116.

At 702, a service provider network 102 may host a workload using a first virtual computing resource that is provisioned on first computing resources of a service provider network where the first virtual computing resource being of a first virtual computing resource type. For instance, a workload 116 of a user 106 may be hosted on a VM instance 114 of a first VM instance type 130.

At 704, the service provider network 102 may receive, via a user account associated with the workload, a first request for a recommendation of a virtual computing resource type that is optimized to support the workload. For instance, the user 106 may access their user account 232 and request that the optimization service 104 provide recommendation data 132 including a recommended VM instance type 228.

At 706, the service provider network 102 may provide the user account with access to recommendation data including an indication of a second virtual computing resource type that is optimized to host the workload. For instance, the optimization component 104 may provide the user account 232 with access (via the portal 122) to the recommendation data 134 that includes an indication of a second VM instance type 130 that is optimized to host the workload (e.g., VM instance recommendations 138).

At 708, the service provider network 102 may receive, from the user account, a second request to test the second virtual computing resource type for hosting the workload. For instance, the user 106 may use their user account 232 to select a test instance type option 320 presented in a GUI 302.

At 710, the service provider network 102 may, in response to receiving the second request, provision a test virtual computing resource on second computing resources of the service provider network where the test virtual computing resource is of the second virtual computing resource type. For instance, the service provider network 102 may automatically (e.g., one-click process) provision a test VM instance 146 on the computing devices 112(2) where the test VM instance 146 is of the second VM instance type 130.

At 712, the service provider network 102 may deploy a test workload to the test virtual computing resource to be hosted by the test virtual computing resource. For instance, the compute-management service 140 may deploy the deployment packet of the test workload 148 to the test VM instance 146.

At 714, the service provider network 102 may receive first utilization data indicating first amounts of the first computing resources utilized by the first virtual computing resource to support the workload. For instance, the service provider network 102 may receive resource-utilization data 132 indicating amounts of the resources of the computing device(s) 112(1) to support the workload 116.

At 716, the service provider network 102 may receive second utilization data indicating second amounts of the second computing resources utilized by the test virtual computing resource to support the test workload. For instance, the service provider network 102 may receive resource-utilization data 132 indicating amounts of the resources of the computing device(s) 112(2) to support the test workload 148.

At 718, the service provider network 102 may determine, using the first utilization data, a first performance metric indicating a first performance of the first virtual computing resource while hosting the workload. For instance, the service provider network 102 may determine data throughput compared to computing resources allocated to the VM instance 114, error rate, packet drops, latency, and/or other metrics indicative of performance of the VM instance 114 when hosting the workload 116.

At 720, the service provider network 102 may determine, using the second utilization data, a second performance metric indicating a second performance of the test virtual computing resource while hosting the test workload. For instance, the service provider network 102 may determine data throughput compared to computing resources allocated to the test VM instance 146, error rate, packet drops, latency, and/or other metrics indicative of performance of the test VM instance 146 when hosting the test workload 148.

At 722, the service provider network 102 may provide the user account with access to the first performance metric and the second performance metric. For instance, the service provider network 102 may send performance data 232 to the user device 108 via the user account 232.

In some instances, the method 700 may further include providing the user account 232 with access to a user interface 302 that includes a selectable option 320 associated with automatically provisioning the test virtual computing resource, wherein the second request is received via the selectable option.

In some instances, the method 700 may additionally include, subsequent to providing the first performance metric and the second performance metric, receiving, via the user account, a request to migrate a plurality of workloads from being hosted on a plurality of first virtual computing resources of the first virtual computing resource type to being hosted on a plurality of second virtual computing resources of the second virtual computing resource type, and migrating the plurality of workloads from being hosted on the plurality of first virtual computing resources to being hosted on the plurality of second virtual computing resources.

In some instances, the method 700 may include receiving, at the service provider network 102, a data flow 504 associated with the workload 116, and duplicating the data flow to result in a duplicate data flow 504B. Further, the method 700 may include sending the data flow 504A to the workload 116 executing on the first virtual computing resource 114, and sending the duplicate data flow 504B to the test workload 148 executing on the test virtual computing resource 146.

Figure 8:
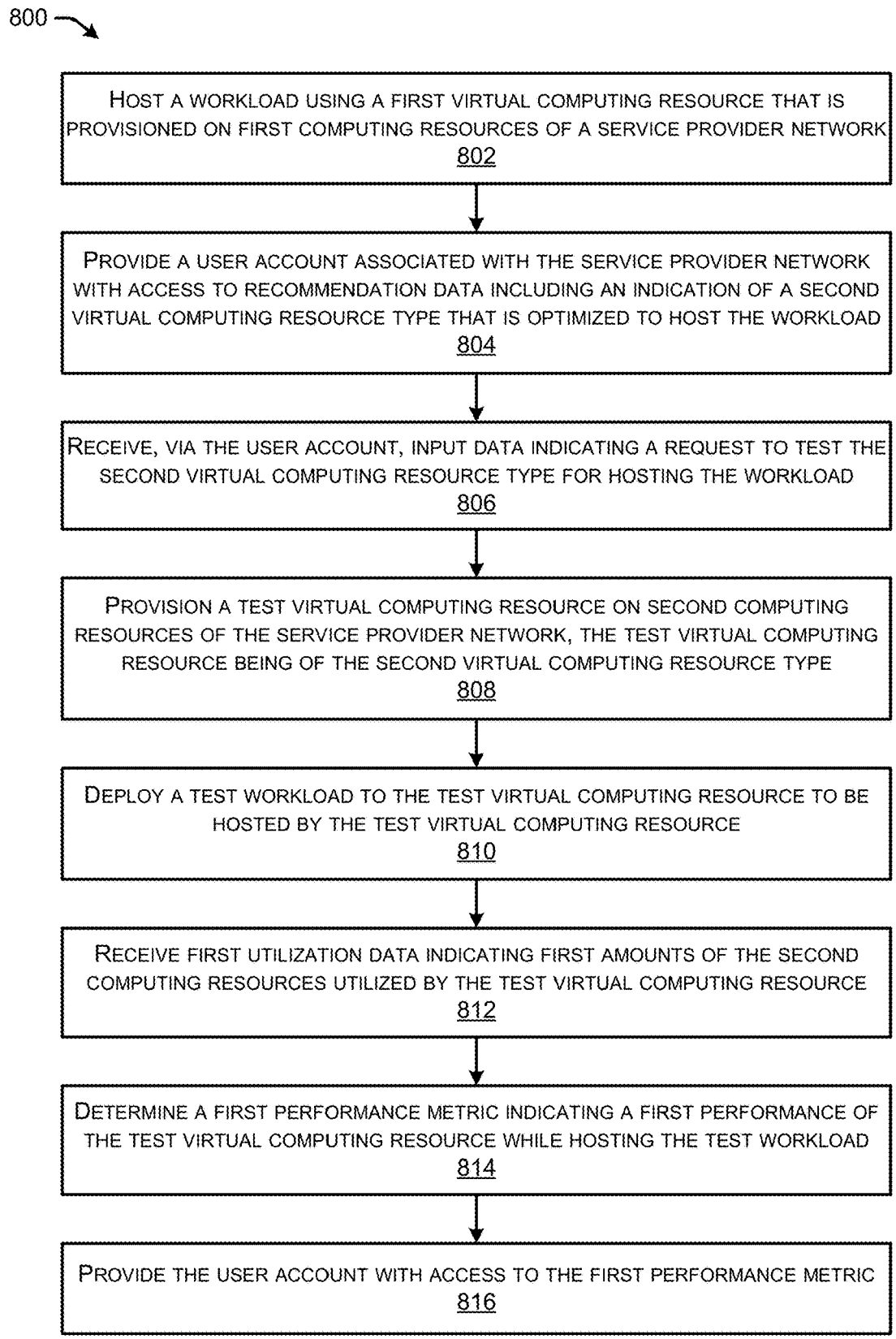
FIG. 8 illustrates a flow diagram of an example method for a service provider network to receive a resource-utilization data for a workload, provide a recommended VM instance type for the workload, and test the recommended VM instance type for the workload.

FIG. 8 illustrates a flow diagram of an example method 800 for a service provider network 102 to receive a resource-utilization data 132 for a workload 116, provide a recommended VM instance type 130 for the workload 116, and test the recommended VM instance type 138 for the workload 116. As described herein, a virtual computing resource may comprise one or more of a VM instance 114, a virtual container, a program, and/or any other virtual representation.

At 802, the service provider network 102 may host a workload using a first virtual computing resource that is provisioned on first computing resources of a service provider network, the first virtual computing resource being of a first virtual computing resource type. For instance, a workload 116 of a user 106 may be hosted on a VM instance 114 of a first VM instance type 130.

At 804, the service provider network 102 may provide a user account associated with the service provider network with access to recommendation data including an indication of a second virtual computing resource type that is optimized to host the workload. For instance, the optimization component 104 may provide the user account 232 with access (via the portal 122) to the recommendation data 134 that includes an indication of a second VM instance type 130 that is optimized to host the workload (e.g., VM instance recommendations 138).

At 806, the service provider network 102 may receive, via the user account, input data indicating a request to test the second virtual computing resource type for hosting the workload. For instance, the user 106 may use their user account 232 to select a test instance type option 320 presented in a GUI 302.

At 808, the service provider network 102 may, in response to receiving the input data, provision a test virtual computing resource on second computing resources of the service provider network, the test virtual computing resource being of the second virtual computing resource type. For instance, the service provider network 102 may automatically (e.g., one-click process) provision a test VM instance 146 on the computing devices 112(2) where the test VM instance 146 is of the second VM instance type 130.

At 810, the service provider network 102 may deploy a test workload to the test virtual computing resource to be hosted by the test virtual computing resource.

At 812, the service provider network 102 may receive first utilization data indicating first amounts of the second computing resources utilized by the test virtual computing resource to support the test workload. For instance, the compute-management service 140 may deploy the deployment packet of the test workload 148 to the test VM instance 146.

At 814, the service provider network 102 may determine, using the first utilization data, a first performance metric indicating a first performance of the test virtual computing resource while hosting the test workload. For instance, the service provider network 102 may determine data throughput compared to computing resources allocated to the test VM instance 146, error rate, packet drops, latency, and/or other metrics indicative of performance of the test VM instance 146 when hosting the test workload 148.

At 816, the service provider network 102 may providing the user account with access to the first performance metric. For instance, the service provider network 102 may send performance data 232 to the user device 108 via the user account 232.

Figure 9A:
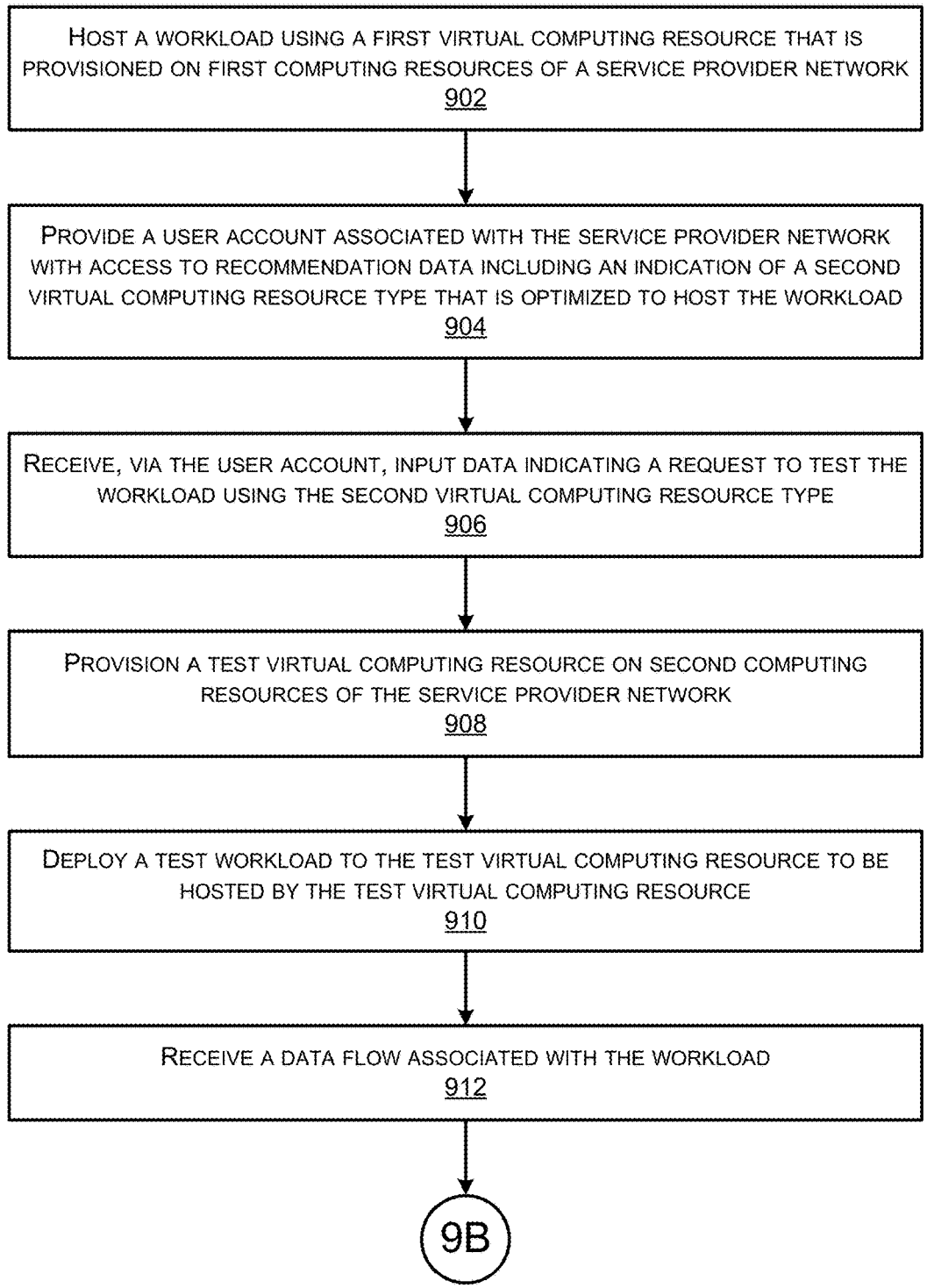
FIGS. 9A and 9B collectively illustrate a flow diagram of an example method for a service provider network to receive utilization data for a workload, provide a recommendation of a VM instance type that is optimized for the workload, and test the recommended VM instance type for hosting the workload using a duplicated data flow.
Figure 9B:
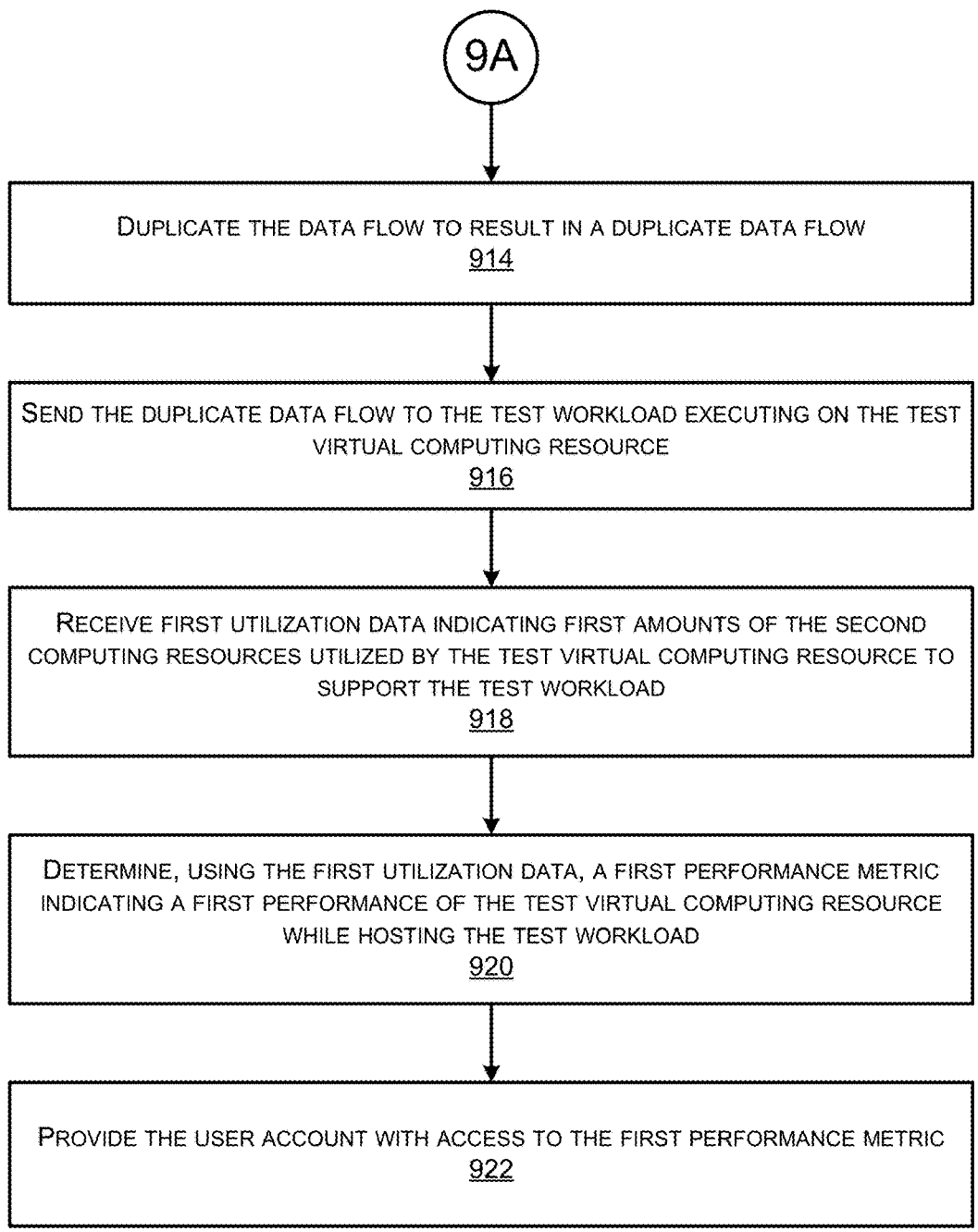

FIGS. 9A and 9B collectively illustrate a flow diagram of an example method 900 for a service provider network 102 to receive utilization data 132 for a workload 116, provide a recommendation 134 of a VM instance type 130 that is optimized for the workload 116, and test the recommended VM instance type 130 for hosting the workload 116 using a duplicated data flow 504B. As described herein, a virtual computing resource may comprise one or more of a VM instance 114, a virtual container, a program, and/or any other virtual representation.

At 902, the service provider network 102 may host a workload using a first virtual computing resource that is provisioned on first computing resources of a service provider network, the first virtual computing resource being of a first virtual computing resource type;

At 904, the service provider network 102 may provide a user account associated with the service provider network with access to recommendation data including an indication of a second virtual computing resource type that is optimized to host the workload; At 906, the service provider network 102 may receive, via the user account, input data indicating a request to test the workload using the second virtual computing resource type;

At 908, the service provider network 102 may, in response to receiving the input data, provision a test virtual computing resource on second computing resources of the service provider network, the test virtual computing resource being of the second virtual computing resource type.

At 910, the service provider network 102 may deploy a test workload to the test virtual computing resource to be hosted by the test virtual computing resource. At 912, the service provider network 102 may receive a data flow associated with the workload. At 914, the service provider network 102 may duplicate the data flow to result in a duplicate data flow.

At 916, the service provider network 102 may send the duplicate data flow to the test workload executing on the test virtual computing resource. At 918, the service provider network 102 may receive first utilization data indicating first amounts of the second computing resources utilized by the test virtual computing resource to support the test workload.

At 920, the service provider network 102 may determine, using the first utilization data, a first performance metric indicating a first performance of the test virtual computing resource while hosting the test workload. At 922, the service provider network 102 may provide the user account with access to the first performance metric.

Figure 10:
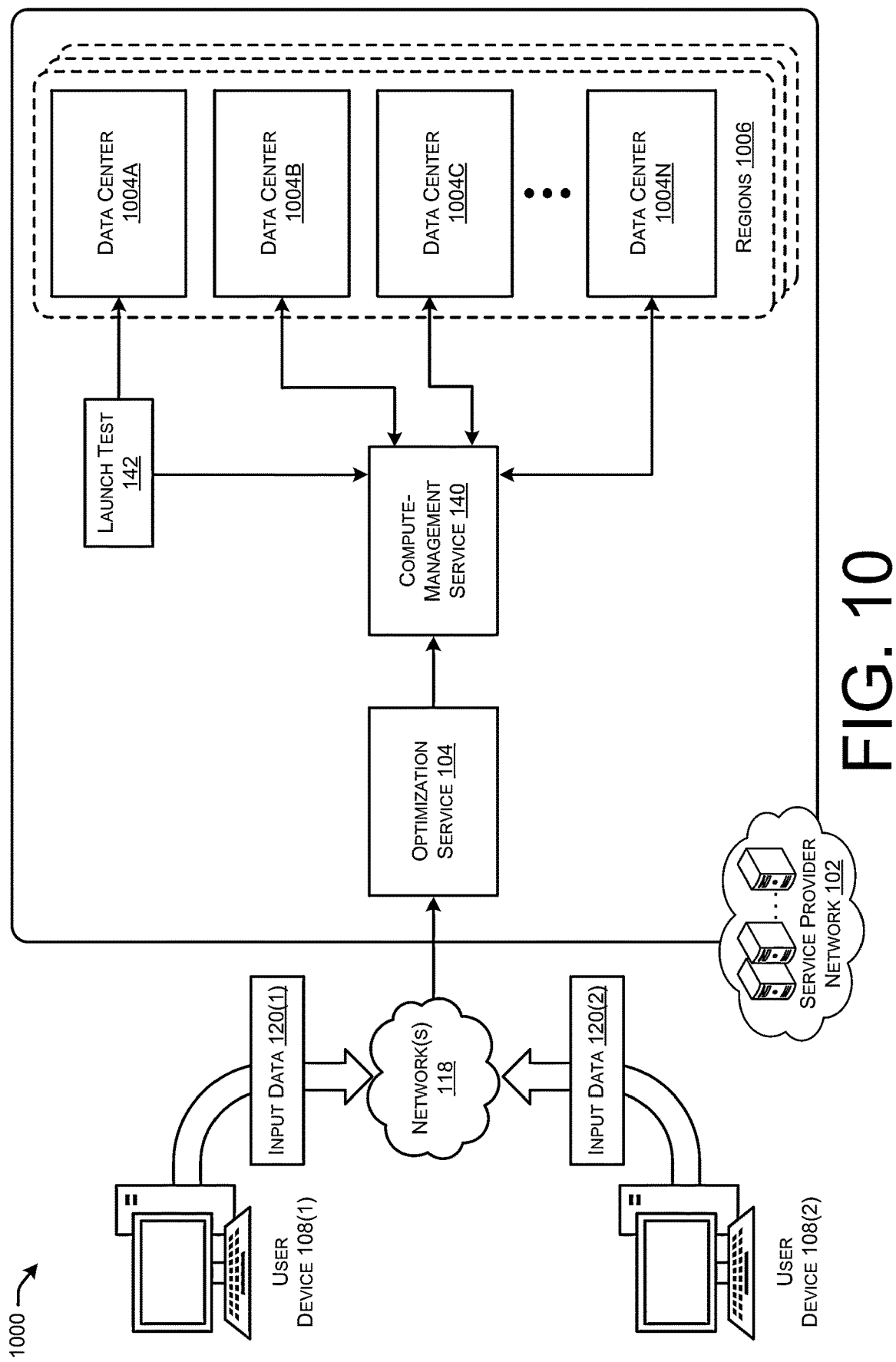
FIG. 10 is a system and network diagram that shows an illustrative operating environment that includes data centers of a service provider network that can be configured to implement aspects of the functionality described herein.

FIG. 10 is a system and network diagram 1000 that shows an illustrative operating environment that includes data centers 1004 in one or more regions 1006 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 1004A-1004N (which might be referred to herein singularly as "a data center 1004" or in the plural as "the data centers 1004"). The data centers 1004 are facilities utilized to house and operate computer systems and associated components. The data centers 1004 typically include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

The users 106 of the user devices 108 that utilize the service provider network 102 may access the computing resources provided by the service provider network 102 over any wired and/or wireless network(s) 118, which can be a wide area communication network ("WAN"), such as the Internet, an intranet or an Internet service provider ("ISP") network or a combination of such networks. For example, and without limitation, a user device 108 operated by a user 106 of the service provider network 102 may be utilized to access the service provider network 102 by way of the network(s) 118. It should be appreciated that a local-area network ("LAN"), the Internet, or any other networking topology known in the art that connects the data centers 1004 to remote clients and other users can be utilized. It should also be appreciated that combinations of such networks can also be utilized.

As illustrated, user devices 108(1) and 108(2) may submit input data 120(1) and 120(2) for defining parameters for a testing environment 144 in which test VM instances 146 are to host test workloads 148 in the computing-resource network 110. In some examples, the input data 120(1) and 120(2) may be associated with a same user account 236, or with different user accounts 236. The optimization component 126 may then instruct the compute-management service 140 to launch the test 142 in a testing environment 144 for a period of time in order to test the performance of the test workloads 148 hosted on test VM instances 146 in the data centers 1004.

Figure 11:
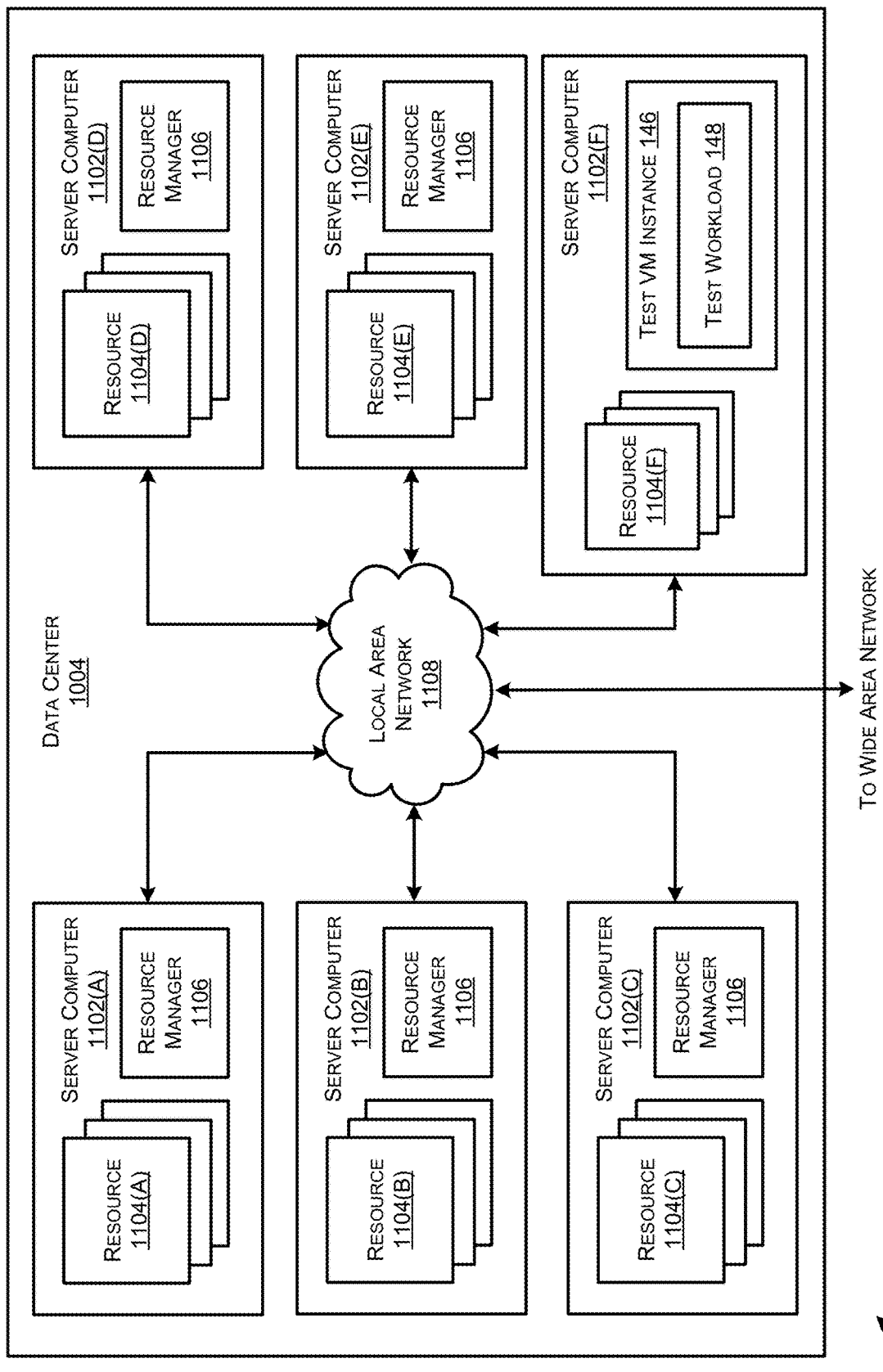
FIG. 11 is a computing system diagram illustrating a configuration for a data center that can be utilized to implement aspects of the technologies disclosed herein.

FIG. 11 is a computing system diagram 1100 that illustrates one configuration for a data center 1004 that implements aspects of the technologies disclosed herein. The example data center 1004 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing devices 112 described herein.

The server computers 1102 can be standard tower, rack-mount, or blade server computers configured appropriately for providing the computing resources described herein (illustrated in FIG. 11 as the computing resources 1104A-1104E). As mentioned above, the computing resources provided by the service provider network 102 can be data processing resources such as VM instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1004 can also be configured to provide network services and other types of services.

In the example data center 1004 shown in FIG. 11, an appropriate LAN 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004A-1004N, between each of the server computers 1102A-1102F in each data center 1004, and, potentially, between computing resources in each of the server computers 1102. It should be appreciated that the configuration of the data center 1004 described with reference to FIG. 11 is merely illustrative and that other implementations can be utilized.

The data center 1004 shown in FIG. 11 also includes a server computer 1102F that can execute some or all of the software components described above. For example, and without limitation, the server computer 1102F (and the other server computers 1102) can generally be included in to the computing devices 112 of FIG. 1 and be configured to execute components, including the components of the optimization service 104, the compute-management service 140, the computing-resource network 110, and/or the other software components described above. The server computer 1102F can also be configured to execute other components and/or to store data for providing some or all of the functionality described herein. In this regard, it should be appreciated that the services illustrated in FIG. 11 as executing on the server computer 1102F can execute on many other physical or virtual servers in the data centers 1104 in various embodiments.

Figure 12:
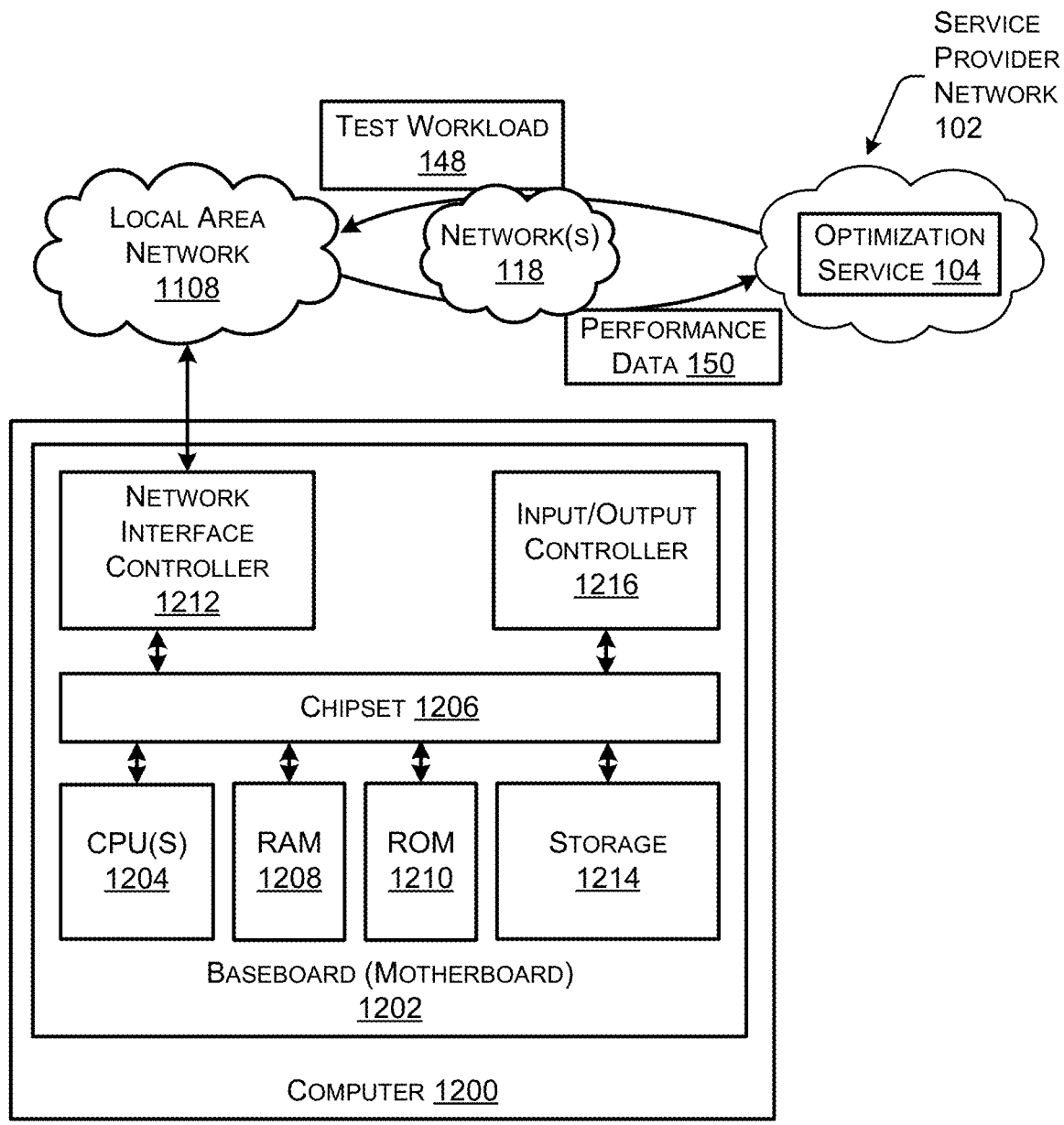
FIG. 12 is a computer architecture diagram showing an illustrative computer hardware architecture for implementing a computing device that can be utilized to implement aspects of the various technologies presented herein.

FIG. 12 shows an example computer architecture for a computer 1200 capable of executing program components for implementing the functionality described above. The computer architecture shown in FIG. 12 illustrates a conventional server computer, workstation, desktop computer, laptop, tablet, network appliance, e-reader, smartphone, or other computing device, and can be utilized to execute any of the software components presented herein. In some examples, the server computer 1200 may correspond to, or be the same as or similar to, a computing device 112 described in FIG. 1.

The computer 1200 includes a baseboard 1202, or "motherboard," which is a printed circuit board to which a multitude of components or devices can be connected by way of a system bus or other electrical communication paths. In one illustrative configuration, one or more central processing units ("CPUs") 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a read-only memory ("ROM") 1210 or non-volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network, such as the network 1108. The chipset 1206 can include functionality for providing network connectivity through a network interface controller (NIC) 1212, such as a gigabit Ethernet adapter. The NIC 1212 is capable of connecting the computer 1200 to other computing devices over the network 1108 (or 118). It should be appreciated that multiple NICs 1212 can be present in the computer 1200, connecting the computer to other types of networks and remote computer systems.

The computer 1200 can include storage 1214 (e.g., disk) that provides non-volatile storage for the computer. The storage 1214 can consist of one or more physical storage units. The storage 1214 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope of the present description, with the foregoing examples provided only to facilitate this description. The computer 1200 can further read information from the storage 1214 by detecting the physical states or characteristics of one or more particular locations within the physical storage units.

In addition to the storage 1214 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 102, and or any components included therein, may be supported by one or more devices similar to computer 1200. Stated otherwise, some or all of the operations performed by the service provider network 102, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 1214 can store an operating system utilized to control the operation of the computer 1200. According to one embodiment, the operating system comprises the LINUX operating system. According to another embodiment, the operating system comprises the WINDOWS SERVER operating system from MICROSOFT Corporation of Redmond, Wash. According to further embodiments, the operating system can comprise the UNIX operating system or one of its variants. It should be appreciated that other operating systems can also be utilized. The storage 1214 can store other system or application programs and data utilized by the computer 1200.

In one embodiment, the storage 1214, RAM 1208, ROM 1210, and/or other computer-readable storage media may be encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various techniques described above. The computer 1200 can also include computer-readable storage media having instructions stored thereupon for performing any of the other computer-implemented operations described herein.

Generally, the computer 1200 may be an example of a computing device 112 (and other computing devices, servers, etc.) described herein. The CPU(s) 1204, RAM 1208, ROM 1210, storage 1214, bandwidth of the NIC 1212, and/or other resources of the computer 1200 may be allocated to one or more different VM instances 114 as described herein based on the VM instance types 130.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
   one or more processors; and
   one or more computer-readable media storing computer-executable instructions that, when executed by the one or more processors, cause the one or more processors to perform operations comprising:
   hosting a workload using a first virtual computing resource that is provisioned on first computing resources of a service provider network, the first virtual computing resource being of a first virtual computing resource type;

determining that a second virtual computing resource type, provided by the service provider network, is more optimal to host the workload than the first virtual computing resource type;

providing a user account with access to recommendation data including an indication of the second virtual computing resource type;

receiving, from the user account, a request to test the second virtual computing resource type for hosting the workload;

in response to receiving the request, provisioning a test virtual computing resource on second computing resources of the service provider network, the test virtual computing resource being of the second virtual computing resource type;

hosting a test workload on the test virtual computing resource;

receiving utilization data indicating amounts of the second computing resources utilized by the test virtual computing resource to support the test workload;

determining, using the utilization data, a performance metric indicating a performance of the test virtual computing resource while hosting the test workload;

determining, using the performance metric, that the workload running on the test virtual computing resource is more optimal than the workload running on the first virtual computing resource; and providing the user account with access to the performance metric.

2. The system of claim 1, the operations further comprising providing the user account with access to a user interface that includes a selectable option associated with automatically provisioning the test virtual computing resource, wherein the request is received via the selectable option.

3. The system of claim 1, the operations further comprising, subsequent to providing the performance metric:

receiving, via the user account, a request to migrate a plurality of workloads from being hosted on a plurality of first virtual computing resources of the first virtual computing resource type to being hosted on a plurality of second virtual computing resources of the second virtual computing resource type; and migrating the plurality of workloads from being hosted on the plurality of first virtual computing resources to being hosted on the plurality of second virtual computing resources.

4. The system of claim 1, the operations further comprising:

receiving, at the service provider network, a data flow associated with the workload;

duplicating the data flow to result in a duplicate data flow;

sending the data flow to the workload executing on the first virtual computing resource; and sending the duplicate data flow to the test workload executing on the test virtual computing resource.

5. A computer-implemented method comprising:

hosting a workload using a first virtual computing resource that is provisioned on first computing resources of a service provider network, the first virtual computing resource being of a first virtual computing resource type;

determining that a second virtual computing resource type, provided by the service provider network, is more optimal to host the workload than the first virtual computing resource type;

providing a user account associated with the service provider network with access to recommendation data including an indication of the second virtual computing resource type;

receiving, via the user account, input data indicating a request to test the second virtual computing resource type for hosting the workload;

in response to receiving the input data, provisioning a test virtual computing resource on second computing resources of the service provider network, the test virtual computing resource being of the second virtual computing resource type;

hosting a test workload on the test virtual computing resource;

receiving first utilization data indicating first amounts of the second computing resources utilized by the test virtual computing resource to support the test workload;

determining, using the first utilization data, a first performance metric indicating a first performance of the test virtual computing resource while hosting the test workload; and determining, using the first performance metric, that the workload running on the test virtual computing resource is more optimal than the workload running on the first virtual computing resource.

6. The computer-implemented method of claim 5, further comprising:

receiving second utilization data indicating second amounts of the first computing resources utilized by the first virtual computing resource to support the workload;

determining, using the second utilization data, a second performance metric indicating a second performance of the first virtual computing resource while hosting the workload;

providing the user account with access to the first performance metric; and providing the user account with access to the second performance metric.

7. The computer-implemented method of claim 6, further comprising:

receiving, at the service provider network, a data flow associated with the workload;

duplicating the data flow to result in a duplicate data flow;

sending the data flow to the workload executing on the first virtual computing resource; and sending the duplicate data flow to the test workload executing on the test virtual computing resource, wherein the first performance metric indicates the first performance of the test virtual computing resource while the test workload services the duplicate data flow and the second utilization data indicates the second performance of the first virtual computing resource while the workload services the data flow.

8. The computer-implemented method of claim 5, further comprising providing the user account with access to a user interface that includes a selectable option associated with automatically provisioning the test virtual computing resource, wherein the input data is received via the selectable option.

9. The computer-implemented method of claim 5, further comprising, subsequent to providing the first performance metric:

receiving, via the user account, another request to migrate a plurality of workloads from being hosted on a plurality of first virtual computing resources of the first virtual computing resource type to being hosted on a plurality of second virtual computing resources of the second virtual computing resource type; and migrating the plurality of workloads from being hosted on the plurality of first virtual computing resources to being hosted on the plurality of second virtual computing resources.

10. The computer-implemented method of claim 5, further comprising:

determining that the first performance metric satisfies a threshold performance metric; and based at least in part on the first performance metric satisfying the threshold performance metric, migrating a plurality of workloads from being hosted on a plurality of first virtual computing resources of the first virtual computing resource type to be hosted on a plurality of second virtual computing resources of the second virtual computing resource type.

11. The computer-implemented method of claim 5, wherein the test workload is a first test workload and the test virtual computing resource type is a first test virtual computing resource type, further comprising:

providing the user account with additional recommendation data including an additional indication of a third virtual computing resource type that is optimized to host the workload;

receiving, via the user account, additional input data indicating an additional request to test the workload using the third virtual computing resource type;

provisioning a second test virtual computing resource on third computing resources of the service provider network, the second test virtual computing resource being of the third virtual computing resource type;

deploying a second test workload to the second test virtual computing resource to be hosted by the second test virtual computing resource;

determining a second performance metric indicating a second performance of the second test virtual computing resource while hosting the second test workload; and providing the user account with access to the second performance metric.

12. The computer-implemented method of claim 5, further comprising:

determining that the first virtual computing resource is in a virtual private network (VPN) receiving data flows from a first load balancer; and establishing a test VPN communicatively connected to a test load balancer in the service provider network, wherein provisioning the test virtual computing resource on the second computing resources comprises launching the test virtual computing resource in the test VPN to be provided test data flows by the test load balancer.

13. The computer-implemented method of claim 5, further comprising:

determining that a plurality of workloads being are being hosted on a plurality of first virtual computing resources of the first virtual computing resource type in a virtual private network (VPN) that is provided data flows by a load balancer;

wherein provisioning the test virtual computing resource on the second computing resources comprises launching the test virtual computing resource in the VPN.

14. A system comprising:

one or more processors; and one or more computer-readable media storing computer-executable instructions that, when executed by the one or more processors, cause the one or more processors to perform operations comprising:

hosting a workload using a first virtual computing resource that is provisioned on first computing resources of a service provider network, the first virtual computing resource being of a first virtual computing resource type;

providing a user account associated with the service provider network with access to recommendation data including an indication of a second virtual computing resource type that is optimized to host the workload;

receiving, via the user account, input data indicating a request to test the workload using the second virtual computing resource type;

in response to receiving the input data, provisioning a test virtual computing resource on second computing resources of the service provider network, the test virtual computing resource being of the second virtual computing resource type;

hosting a test workload on the test virtual computing resource;

receiving a data flow associated with the workload;

duplicating the data flow to result in a duplicate data flow;

sending the duplicate data flow to the test workload executing on the test virtual computing resource;

receiving first utilization data indicating first amounts of the second computing resources utilized by the test virtual computing resource to support the test workload;

determining, using the first utilization data, a first performance metric indicating a first performance of the test virtual computing resource while hosting the test workload;

determining, using the first performance metric, that the workload running on the test virtual computing resource is more optimal than the workload running on the first virtual computing resource; and providing the user account with access to the first performance metric.

15. The system of claim 14, the operations further comprising:

receiving second utilization data indicating second amounts of the first computing resources utilized by the first virtual computing resource to support the workload;

determining, using the second utilization data, a second performance metric indicating a second performance of the first virtual computing resource while hosting the workload; and providing the user account with access to the second performance metric.

16. The system of claim 15, the operations further comprising:

sending the data flow to the workload executing on the first virtual computing resource, wherein the first performance metric indicates the first performance of the test virtual computing resource while the test workload services the duplicate data flow and the second utilization data indicates the second performance of the first virtual computing resource while the workload services the data flow.

17. The system of claim 14, the operations further comprising providing the user account with access to a user interface that includes a selectable option associated with automatically provisioning the test virtual computing resource, wherein the input data is received via the selectable option.

18. The system of claim 14, the operations further comprising, subsequent to providing the first performance metric:
- receiving, via the user account, another request to migrate a plurality of workloads from being hosted on a plurality of first virtual computing resources of the first virtual computing resource type to be hosted on a plurality of second virtual computing resources of the second virtual computing resource type; and
- migrating the plurality of workloads from being hosted on the plurality of first virtual computing resources to be hosted on the plurality of second virtual computing resources.

19. The system of claim 14, the operations further comprising:
- obtaining deployment data associated with the workload, the deployment data including:
  - first data indicating an operating system type of first virtual computing resource on which the workload is running; and
  - second data including a deployment package of the workload,
- wherein deploying the test workload to the test virtual computing resource includes sending the deployment package of the workload to the test virtual computing resource that is running the operating system type.

20. The system of claim 14, the operations further comprising:
- determining that the first virtual computing resource is in a virtual private network (VPN) receiving data flows from a first load balancer; and
- establishing a test VPN that is communicatively coupled to a test load balancer in the service provider network,
- wherein provisioning the test virtual computing resource on the second computing resources comprises launching the test virtual computing resource in the test VPN.

\* \* \* \* \*